United States Patent
Kwon et al.

(10) Patent No.: US 10,390,113 B2
(45) Date of Patent: Aug. 20, 2019

(54) METHOD AND APPARATUS FOR CONTROLLING DEVICE USING BLUETOOTH TECHNOLOGY

(71) Applicant: LG ELECTRONICS INC., Seoul (KR)

(72) Inventors: Younghwan Kwon, Seoul (KR); Jinkwon Lim, Seoul (KR); Hyunsik Yang, Seoul (KR); Minsoo Lee, Seoul (KR); Jingu Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/757,924

(22) PCT Filed: Sep. 7, 2016

(86) PCT No.: PCT/KR2016/010039
§ 371 (c)(1),
(2) Date: Mar. 6, 2018

(87) PCT Pub. No.: WO2017/043869
PCT Pub. Date: Mar. 16, 2017

(65) Prior Publication Data
US 2018/0352312 A1 Dec. 6, 2018

Related U.S. Application Data

(60) Provisional application No. 62/215,070, filed on Sep. 7, 2015, provisional application No. 62/215,073, filed on
(Continued)

(51) Int. Cl.
*H04Q 9/04* (2006.01)
*H04W 4/80* (2018.01)
(Continued)

(52) U.S. Cl.
CPC ............... *H04Q 9/04* (2013.01); *H04W 4/00* (2013.01); *H04W 4/80* (2018.02); *H04W 8/005* (2013.01);
(Continued)

(58) Field of Classification Search
CPC .......... H04Q 9/04; H04W 4/80; H04W 8/005; H04W 12/06; H04W 76/14
(Continued)

(56) References Cited

U.S. PATENT DOCUMENTS

2007/0220270 A1\* 9/2007 Murakami ............... G06F 21/35
713/183
2008/0274696 A1 11/2008 Bakshi et al.
(Continued)

FOREIGN PATENT DOCUMENTS

KR 10-2013-0111165 A 10/2013
WO WO 2015/069024 A1 5/2015

*Primary Examiner* — John J Lee
(74) *Attorney, Agent, or Firm* — Birch, Stewart, Kolasch & Birch, LLP

(57) ABSTRACT

Provided are a method and an apparatus for controlling device using Bluetooth technology. A method of controlling a first device by a control device using Bluetooth includes receiving an advertising message including service information indicating whether a device control service is supported from the first device, establishing a Bluetooth LE connection with the first device when the first device supports the device control service, transmitting a read request message to the first device to request feature information related to a controllable operation mode and procedure supported by the first device, receiving a read response message including the feature information in response to the read request message, transmitting a first write request message for requesting writing of a control characteristic for controlling a specific operation related to pairing and connection of the first device based on the supported feature information, and receiving a
(Continued)

first write response message in response to the first write request message. Here, the write request message includes control information related to the specific operation.

14 Claims, 34 Drawing Sheets

Related U.S. Application Data on Sep. 7, 2015, provisional application No. 62/243,144, filed on Oct. 19, 2015, provisional application No. 62/259,001, filed on Nov. 23, 2015.

(51) Int. Cl.
| | | |
|---|---|---|
| *H04W 76/10* | (2018.01) | |
| *H04W 4/00* | (2018.01) | |
| *H04W 76/14* | (2018.01) | |
| *H04W 8/00* | (2009.01) | |
| *H04W 12/06* | (2009.01) | |

(52) U.S. Cl.
CPC .......... *H04W 12/06* (2013.01); *H04W 76/10* (2018.02); *H04W 76/14* (2018.02)

(58) Field of Classification Search
USPC ........ 455/41.2, 41.3, 3.01, 452.1, 11.1, 41.1, 455/517
See application file for complete search history.

(56) References Cited

U.S. PATENT DOCUMENTS

| | | |
|---|---|---|
| 2012/0195387 A1 | 8/2012 | Masuda |
| 2014/0169599 A1 | 6/2014 | Solum et al. |
| 2015/0365899 A1* | 12/2015 | Hayashi ............ H04W 52/0235 455/41.1 |
| 2016/0043779 A1* | 2/2016 | Maeda ................. H04B 5/0056 455/41.1 |
| 2017/0134609 A1* | 5/2017 | Park .................... H04N 1/00278 |
| 2017/0195432 A1* | 7/2017 | Amano ............... H04L 41/5058 |

* cited by examiner

FIG.11

| Number of Associations(=n) (1 byte) | Peer Device ID₁ (7 bytes) | Bearer₁ (1 byte) | Status₁ (1 byte) | ... | Peer DeviceIDₙ (7 bytes) | Bearerₙ (1 byte) | Statusₙ (1 byte) |
|---|---|---|---|---|---|---|---|

(a) Association Status Characteristic

| bit | Status | Description |
|---|---|---|
| 0ᵗʰ bit | Not Connected (0) | Target device is not connected at link layer with another Peer Device. |
| | Connected (1) | Target device is connected at link layer with another Peer Device. |
| 1ˢᵗ bit | Not Paired (0) | Target device is not paired with another Peer Device. |
| | Paired (1) | Target device is paired with another Peer Device. |
| 2ⁿᵈ bit | Not bonded (0) | Target device is not bonded with another Peer Device. |
| | Bonded (1) | Target device is bonded with another Peer Device. |
| 3ʳᵈ ~ 7ᵗʰ bit | RFU (Reserved for Future Use) | It shall be set to 0. |

(b) Status

FIG.12

| Peer Device ID(7 bytes) | Bearer(1 byte) | Status(1 byte) |

(a) Association Status Information

| bit | Status | Description |
|---|---|---|
| 0th bit | Not Connected (0) | Target device is not connected with another Target device. |
| | Connected (1) | Target device is connected with another Target device |
| 1st bit | Not Paired (0) | Target device is not paired with another Target device |
| | Paired (1) | Target device is paired with another Target device |
| 2nd bit | Not bonded (0) | Target device is not bonded with another Target device |
| | Bonded (1) | Target device is bonded with another Target device |
| 3rd ~ 7th bit | RFU (Reserved for Future Use) | It shall be set to 0. |

(b) Status

FIG.13

| Peer Device ID(7 bytes) | LE Status (1 byte) | BR/EDR Status (1 byte) |
|---|---|---|

(a) Association Status Information

| Peer Device ID (7 bytes) | Number of Bearers(1 byte) | Bearer₁ (1 byte) | Status₁ (1 byte) | ... | Bearerₙ (1 byte) | Statusₙ (1 byte) |
|---|---|---|---|---|---|---|

(b) Association Status Information

FIG.14

| Opcode (1 byte) | Peer Device ID (7 bytes) | Bearer (1byte) | Operation Mode and Procedure (2 bytes) |

(a) Control Point and Control Information

| Opcode | Operand | Description |
|---|---|---|
| Discover a Device | Peer Device ID & Transport Type & Discovery Operation | Target device discovers the Peer Device |
| Set a Discoverable Mode | Peer Device ID & Bearer & Discovery Mode | Target device becomes in the Discoverable Mode |
| Make a Connection | Peer Device ID & Bearer & Connection Procedure | Target device makes a connection to the Peer Device |
| Set a Connectable Mode | Peer Device ID & Bearer & Connectable Mode | Target device prepares to accept the Connection Request |
| Terminatea Connection | Peer Device ID (or All devices) & Bearer & Termination Type | Target device terminates a connection with the Peer Device (or all connections) |
| Make a Pairing | Peer Device ID | Target device makes a pairing to the Peer Device |
| Remove a Pairing | Peer Device ID (or All devices) | Target device terminates a pairing with the Peer Device (or all connections) |
| Make a Bonding | Peer Device ID | Target device makes a bonding relation with the Peer device |
| Remove Bondings | Peer Device ID (or All devices) | Target device removes a bonding information with the Peer device or all bonding information |

(b) Opcode and Operand

FIG.15

| Opcode | Operand |
|---|---|
| 0x01 | Make a Connection in the Connectable Mode (BR/EDR) |
| 0x02 | Make a Connection in Directed Connectable Mode (LE) |
| 0x03 | Make a Connection in Undirected Connectable Mode (LE) |
| 0x04 | Make a Connection with Connection Procedure (BR/EDR) |
| 0x05 | Make a Connection with Auto Connection Procedure (LE) |
| 0x06 | Make a Connection in General Connection Procedure (LE) |
| 0x07 | Make a Connection in Selective Connection Procedure (LE) |
| 0x08 | Make a Connection in General Connection Procedure (LE) |
| 0x09 | Make a Connection with Pairing (BR/EDR) |
| 0x0A | Make a Connection with Pairing (LE) |
| 0x0B | Make a Connection with Bonding (BR/EDR) |
| 0x0C | Make a Connection with Bonding (LE) |
| 0x0D | Make a Connection with Pairing & Bonding (BR/EDR) |
| 0x0E | Make a Connection with Pairing & Bonding (LE) |
| 0x0F | Terminate a Connection with removing Pairing (BR/EDR) |
| 0x10 | Terminate a Connection with removing Pairing (LE) |
| 0x11 | Terminate a Connection with removing Bonding (BR/EDR) |
| 0x12 | Terminate a Connection with removing Bonding (LE) |
| 0x13 | Terminate a Connection with removing Pairing & Bonding (BR/EDR) |
| 0x14 | Terminate a Connection with removing Pairing & Bonding (LE) |
| 0x15 ~ 0xFF | Reserved For Future Use |

Opcode and Operand

FIG.17

| Supported Bearer (1 byte) | Device Roles (1 byte) | Operation Modes and Procedures (4 bytes) |
|---|---|---|

(a) Feature information and Supported Feature Characteristic

| Bits | Type | Description |
|---|---|---|
| 0th bit | BR/EDR | Target device supports BR/EDR transport |
| 1st bit | LE | Target device supports LE transport |
| 2nd ~ 7th bits | RFU (Reserved for Future Use) | It shall be set to 0 |

(b) Supported Bearer

| Bits | Device Roles | | Description |
|---|---|---|---|
| 0th & 1st bit | BR/EDR | Initiator | Target device supports the initiator role over BR/EDR transport |
| | | Acceptor | Target device supports the acceptor role over BR/EDR transport |
| 2nd ~ 6th bit | LE | Peripheral | Target device supports the Peripheral role over LE transport |
| | | Central | Target device supports the Central role over LE transport |
| | | Broadcaster | Target device supports the Broadcaster role over LE transport |
| | | Observer | Target device supports the Observer role over LE transport |
| 7th bit | RFU (Reserved for Future Use) | | It shall be set to 0 |

(c) Device Roles

FIG.18

| | Operation Modes and Procedures | | Description |
|---|---|---|---|
| 2 bits { Discoverability Modes | Limited Discoverable | | Target device as the acceptor supports the Limited Discoverable Mode over BR/EDR |
| | General Discoverable | | Target device as the acceptor supports the General Discoverable Mode over BR/EDR |
| 1 bit { Connectability Modes | Connectable | | Target device as the acceptor supports the Connectable Mode over BR/EDR transport |
| 1 bit { Bondable Mode | Bondable | | Target device as the acceptor supports the Connectable Mode over BR/EDR transport |
| 1 bit { Synchronizable Mode | Synchronizable | | Target device as the acceptor supports the Synchronizable Mode over BR/EDR transport |
| 6 bit { IdleMode Procedures | General Inquiry | | Target device as the initiator supports the General Inquiry Procedure over BR/EDR transport to discover Discoverable devices |
| | Limited Inquiry | | Target device as the initiator supports the General Inquiry Procedure over BR/EDR transport to discover Discoverable devices |
| | Name Discovery | | Target device as the initiator supports the Name Discovery Procedure over BR/EDR transport to retrieve the Bluetooth Device Name form a Connectable Bluetooth device |
| | Device Discovery | | Target device as the initiator supports the Device Discovery Procedure (General or Limited discovery including Name Discovery) over BR/EDR transport to know a Discoverable and Connectable Bluetooth device |
| | Bonding | General | Target device as the initiator supports the General Bonding Procedure to perform bonding during connection setup or channel establishment procedures to access a service |
| | | Dedicated | Target device as the initiator supports the Dedicated Bonding Procedure when the procedure is only to create and exchange a link key between two Bluetooth devices without accessing a particular service |

Operation Modes and Procedures in BR/EDR

FIG.19

| Operation Modes and Procedures | | Description |
|---|---|---|
| Establishment Procedures | Link Establishment | Target device as the initiator supports the Link Establishment Procedure to establish a logical transport (of ACL type) between Bluetooth devices. |
| | | Target device as the initiator supports the Channel Establishment Procedure to establish a Bluetooth channel (L2CAP channel) between Bluetooth devices. |
| | | Target device as the initiator supports the Connection Establishment Procedure to establish as connection between Applications on two Bluetooth devices. |
| | | Target device as the initiator supports the Synchronization Establishment Procedure to receive the Synchronization train packets from other devices. |

Operation Modes and Procedures in BR/EDR (4 bits)

FIG.20

| Operation Modes and Procedures | | Description |
|---|---|---|
| Broadcast Mode | | Target device as the Broadcaster supports the Broadcast Mode over LE transport |
| Observation Procedure | | Target device as the Observer supports the Observation Procedure over LE transport |
| Discovery Modes | Limited Discoverable | Target device as the Peripheral supports the Limited Discoverable Mode over LE transport |
| | General Discoverable | Target device as the Peripheral supports the General Discoverable Mode over LE transport |
| Discovery Procedures | General Discovery | Target device as the Central supports the General Discovery Procedure over LE transport |
| | Limited Discovery | Target device as the Central supports the Limited Discovery Procedure over LE transport |
| | Name Discovery | Target device as the Central supports the Name Discovery Procedure over LE transport |
| Connection Modes | Directed Connectable | Target device as the Peripheral supports the Directed Discoverable Mode over LE transport for Auto Connection Establishment Procedure or the General Connection Establishment Procedure with directed connectable advertising events. |
| | Undirected Connectable | Target device as the Peripheral supports the Directed Discoverable Mode over LE transport for Auto Connection Establishment Procedure or the General Connection Establishment Procedure with undirected connectable advertising events |

Operation Modes and Procedures in LE (1 bit: Broadcast Mode; 1 bit: Observation Procedure; 2 bit: Discovery Modes; 3 bit: Discovery Procedures; 2 bit: Connection Modes)

FIG.21

| Operation Modes and Procedures | | Description |
|---|---|---|
| Connection Establishment Procedures (6 bit) | Auto Connection Establishment | Target device as the Central supports the Auto Connection Establishment Procedure over LE transport to configure the Controller to autonomously establish a connection with one or more devices in the directed connectable mode or the undirected connectable mode. The White List in the Controller is used in the Initiator filter policy. |
| | General Connection Establishment | Target device as the Central supports the General Connection Establishment Procedure over LE transport to establish a connection with a set of known peer devices in the directed connectable mode or the undirected connectable mode. |
| | Selective Connection Establishment | Target device as the Central supports the Selective Connection Establishment Procedure over LE transport to allows the Host to establish a connection with the Host selected connection configuration parameters with a set of devices address in the White List. The White List in the Controller is used in the Scanner filter policy. |
| | Direct Connection Establishment Procedure | Target device as the Central supports the Direct Connection Establishment Procedure over LE transport to establish a connection with the selected connection configuration with a single peer device. |
| | Connection Parameter Update Procedure | Target device as the Central or Peripheral supports the Connection Parameter Update Procedure over LE transport to update Link Layer connection parameter of an established connection. |
| | Terminate Connection Procedure | Target device as the Central or Peripheral supports the Terminate Connection Procedure over LE transport to terminate the connection with a peer device. |
| Bonding Modes & Procedures (2 bit) | Bondable Mode | Target device as the Central or Peripheral supports the Bondable mode to allow a bond (trust relation) to be created with a peer device |
| | Bonding Procedure | Target device as the Central or Peripheral supports the Bonding Procedure to create a bond between two devices. |

Operation Modes and Procedures in LE

FIG.23

| Characteristic Name | Requirement | Mandatory Properties |
|---|---|---|
| Key Value | M | Read, Write, Indication |

(a) Characteristic

| Opcode | Description |
|---|---|
| Pairing Confirm | Request message to accept pairing process |
| Insert Passkey Value | Request message to provide Numerical Value or Passkey Value for pairing |

(b) Opcode

FIG.30

| Characteristic Name | Requirement | Mandatory Properties |
|---|---|---|
| Password | M | Read, Write, Indication |

(a) Characteristic

| Opcode | Description |
|---|---|
| Lock Password | Lock the password from being modified by the device or other device. |
| UnLock Password | Unlock the password to edit on the device or other device. |
| Authorize a Connection Device | Request authorization to control the connected device. |

(b) Opcode

FIG.33

| Opcode  | Peer Device ID |
|---------|----------------|
| (1 byte)| (7 bytes)      |

(a) Characteristic

| Opcode          | Operand         | Description                                                  |
|-----------------|-----------------|--------------------------------------------------------------|
| Add a Device    | Peer Device ID  | Target device adds the device into its whitelist.            |
| Remove a Device | Peer Device ID  | Target device removes the device in its whitelist            |
| Delete All      |                 | Target device deletes all device in its whitelist            |

(b) Opcode & Operand

METHOD AND APPARATUS FOR CONTROLLING DEVICE USING BLUETOOTH TECHNOLOGY

CROSS REFERENCE TO RELATED APPLICATIONS

This application is the National Phase of PCT International Application No. PCT/KR2016/010039, filed on Sep. 7, 2016, which claims priority under 35 U.S.C. 119(e) to U.S. Provisional Application Nos. 62/215,070 filed on Sep. 7, 2015, 62/215,073 filed on Sep. 7, 2015, 62/243,144 filed on Oct. 19, 2015, and 62/259,001 filed on Nov. 23, 2015, all of which are hereby expressly incorporated by reference into the present application.

BACKGROUND OF THE INVENTION

Field of the Invention

The present invention relates to a method and apparatus for establishing a connection between devices using Bluetooth that is a short-range technology in a wireless communication system, and more particularly, to a method and apparatus for establishing a connection between devices using Bluetooth technology.

Related Art

Bluetooth is an NFC technology standard allowing various devices to be wirelessly connected in a near field to exchange data. In a case in which two devices intend to perform wireless communication using Bluetooth communication, a user may perform a procedure for discovering a Bluetooth device with which he or she wants to communicate and requesting a connection. In the present disclosure, a device may refer to an apparatus or an appliance.

Here, the user may discover a Bluetooth device according to a Bluetooth communication method intended to be used using the Bluetooth device, and subsequently perform a connection.

The Bluetooth communication method may be classified as a BR/EDR method and an LE method. The BR/EDR method may be termed Bluetooth Classic. The Bluetooth Classic method includes a Bluetooth technology led from Bluetooth 1.0 and a Bluetooth technology using an enhanced data rate (EDR) supported by Bluetooth 2.0 or a subsequent version.

A Bluetooth low energy (LE) technology applied, starting from Bluetooth 4.0, may stably provide information of hundreds of kilobytes (KB) at low power consumption. Such a Bluetooth low energy technology allows devices to exchange information with each other by utilizing an attribute protocol. The Bluetooth LE method may reduce energy consumption by reducing overhead of a header and simplifying an operation.

Among the Bluetooth devices, some products do not have a display or a user interface. Complexity of connection, management, control, and disconnection among various types of Bluetooth devices and Bluetooth device employing similar technologies has increased.

Bluetooth supports a high speed at relatively low power consumption and at relatively low cost. However, since a transmission distance thereof is 100 m at the maximum, and thus, Bluetooth is appropriately used within a limited space.

SUMMARY OF THE INVENTION

The present invention provides a method and apparatus for controlling a device using Bluetooth technology.

The present invention also provides a method and apparatus for acquiring status information of a device associated with one or more devices using Bluetooth technology.

The present invention also provides a method and apparatus for controlling a device by acquiring information related to controllable operations from the device using Bluetooth technology.

The present invention also aims at defining a Generic Attribute Profile (GATT) structure for controlling a device using Bluetooth technology.

The present invention also provides a method for setting and cancelling a password for controlling a connection between devices using Bluetooth technology.

The technical objects to be achieved by the present disclosure are not limited to the above-mentioned technical objects, and other technical objects which are not mentioned can be clearly understood by those skilled in the art from the following descriptions.

The present invention provides a method for a first device to control a second device using Bluetooth technology to solve the above-described problems.

In an aspect, a method of controlling a first device by a control device using Bluetooth includes: receiving an advertising message including service information indicating whether a device control service is from the first device; establishing a Bluetooth LE connection with the first device when the first device supports the device control service; transmitting a read request message to the first device to request feature information related to a controllable operation mode and procedure supported by the first device; receiving a read response message including the feature information in response to the read request message; transmitting a first write request message for requesting writing of a control characteristic for controlling a specific operation related to pairing and connection of the first device based on the feature information; and receiving a first write response message in response to the first write request message, wherein the write request message includes control information related to the specific operation.

The feature information may include at least one of a connection type supported by the first device, a role according to the connection type or an operation mode and procedure.

The control information may include at least one of an operation code indicating the specific operation, a peer device ID indicating an address of a peer device to perform the specific operation, a connection type according to the operation code, or operation information indicating operation mode and procedure according to the specific operation.

The method may further include: transmitting a second write request message for requesting setting of a first password for control of the first device; and receiving a second write response message in response to the second write request message.

The control information may further include a second password for control of the specific operation.

The method may include: transmitting a third write request message for changing the first password; and receiving a third write response message in response to the third write request message, wherein the third write request message includes a second password that is a password to be changed.

The connection type may be one of a Bluetooth BR/EDR or a Bluetooth LE.

The address of the peer device may be one of a public address type or a random address type.

The first write response message may include result information indicating whether the first device performs the specific operation.

In another aspect, provided is an apparatus for controlling, by a first device, a second device using Bluetooth. The first device includes: a communication unit for wirelessly or wiredly communicating with the outside; and a processor functionally connected to the communication unit, the processor: receiving an advertising message including service information indicating whether a device control service is supported from the first device; establishing a Bluetooth LE connection with the first device when the first device supports the device control service; transmitting a read request message to the first device to request feature information related to a controllable operation mode and procedure supported by the first device; receiving a read response message including the feature information in response to the read request message; transmitting a write request message for requesting writing of a control characteristic for controlling a specific operation related to pairing and connection of the first device based on the feature information; and receiving a first write response message in response to the write request message, wherein the write request message includes control information related to the specific operation.

BRIEF DESCRIPTION OF THE DRAWINGS

FIGS. 11 to 15 are views illustrating an example of a characteristic for controlling a device proposed in the present disclosure.

FIGS. 17 to 21 are views illustrating another example of a characteristic for providing information related to the controllable operation of a device proposed in the present disclosure.

FIGS. 22 and 23 are views illustrating an example of a method and characteristic for forming a secure connection between devices through a control device proposed in the present disclosure.

FIGS. 29 and 30 are flowcharts illustrating an example of a method and characteristic for setting a password of a device through a control device proposed in the present disclosure.

FIG. 33 is a view illustrating an example of an operation code for management of a whitelist of a device proposed in the present disclosure.

DESCRIPTION OF EXEMPLARY EMBODIMENTS

The aforementioned objects, features and advantages of the present invention will become more apparent through the following detailed description with respect to the accompanying drawings. Hereinafter, the embodiments of the present invention will be described with reference to the accompanying drawings, in which like numbers refer to like elements throughout the specification. In describing the present invention, a detailed description of known techniques associated with the present invention unnecessarily obscure the gist of the present invention, it is determined that the detailed description thereof will be omitted.

Hereinafter, a terminal related to the present invention will be described in detail with reference to the accompanying drawings. In the following description, usage of suffixes such as 'module', 'part' or 'unit' used for referring to elements is given merely to facilitate explanation of the present invention, without having any significant meaning by itself.

Figure 1:
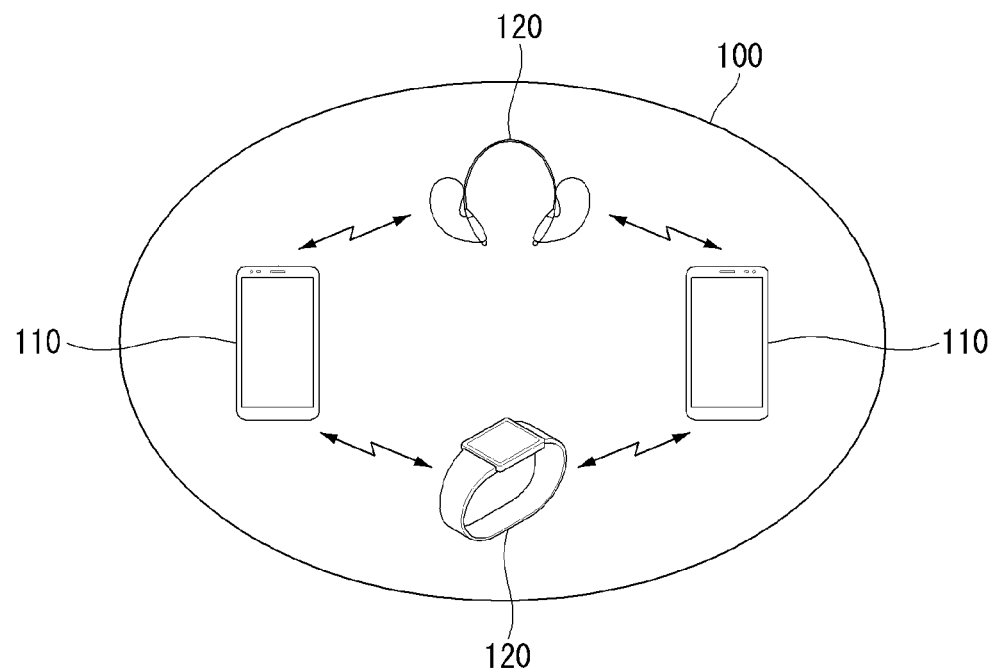
FIG. 1 is a schematic view illustrating an example of a wireless communication system using a Bluetooth low energy technology to which the present invention is applicable.

FIG. 1 is a schematic view illustrating an example of a wireless communication system using a Bluetooth low energy technology to which the present invention is applicable.

A wireless communication system 100 includes at least one server device 120 and at least one client device 110.

The server device and the client device perform Bluetooth communication using a Bluetooth low energy (BLE) technology.

First, compared with a Bluetooth basic rate/enhanced data rate (BR/EDR), the BLE technology has a relatively small duty cycle, may be produced at low cost, and significantly reduce power consumption through a low data rate, and thus, it may operate a year or longer when a coin cell battery is used.

Also, in the BLE technology, an inter-device connection procedure is simplified and a packet size is designed to be small compared with the Bluetooth BR/EDR technology.

In the BLE technology, (1) the number of RF channels is forty, (2) a data rate supports 1 Mbps, (3) topology has a scatternet structure, (4) latency is 3 ms, (5) a maximum current is 15 mA or lower, (6) output power is 10 mW (10 dBm) or less, and (7) the BLE technology is commonly used in applications such as a clock, sports, healthcare, sensors, device control, and the like.

The server device 120 may operate as a client device in a relationship with other device, and the client device may operate as a server device in a relationship with other device. That is, in the BLE communication system, any one device may operate as a server device or a client device, or may operate as both a server device and a client device if necessary.

The server device 120 may also be called as data service device, slave device, slave, server, conductor, host device, gateway, sensing device, monitoring device, first device, or the like, and the client device 110 may also be called as master device, master, client, member, sensor device, sink device, collector, second device, third device, and the like.

The server device and the client device correspond to major components of the wireless communication system, and the wireless communication system may include components other than the server device and the client device.

The server device refers to a device which receives data from the client device and provides data to the client device in response when a corresponding request is received from the client device, through direct communication with the client device.

Also, in order to provide data information to the client device, the server device sends a notification message or an indication message to the client device in order to provide data information to the client device. Also, the server device receives a confirmation message corresponding to the indication message from the client device.

Also, in the process of transmitting and receiving notification, indication, and confirmation messages to and from the client device, the server device may provide data information to a user through a display unit or may receive a request input from the user through a user input interface.

Also, in the process of transmitting and receiving message to and from the client device, the server device may read data from a memory unit or may write new data to the corresponding memory unit.

Also, the single server device may be connected with a plurality of client devices, and may be easily re-connected with client devices using bonding information.

The client device 120 refers to a device which requests data information and data transmission from the server device.

The client device receives data through a notification message or an indication message from the server device, and when an indication message is received from the server device, the client device sends an acknowledgement message in response to the indication message.

Similarly, in the process of transmitting and receiving messages to and from the server device, the client device may also provide information to the user through a display unit or may receive an input from the user through a user input interface.

Also, in the process of transmitting and receiving messages with the server device, the client device may read data from a memory unit or may write new data to the corresponding memory unit.

Hardware components such as the display units, the user input interfaces, and the memory units of the server device and the client device will be described in detail with reference to FIG. 2.

Also, the wireless communication system may configure personal area networking (PAN) through the Bluetooth technology. For example, in the wireless communication system, a private piconet may be established between devices to quickly and safely exchange files, documents, and the like.

Figure 2:
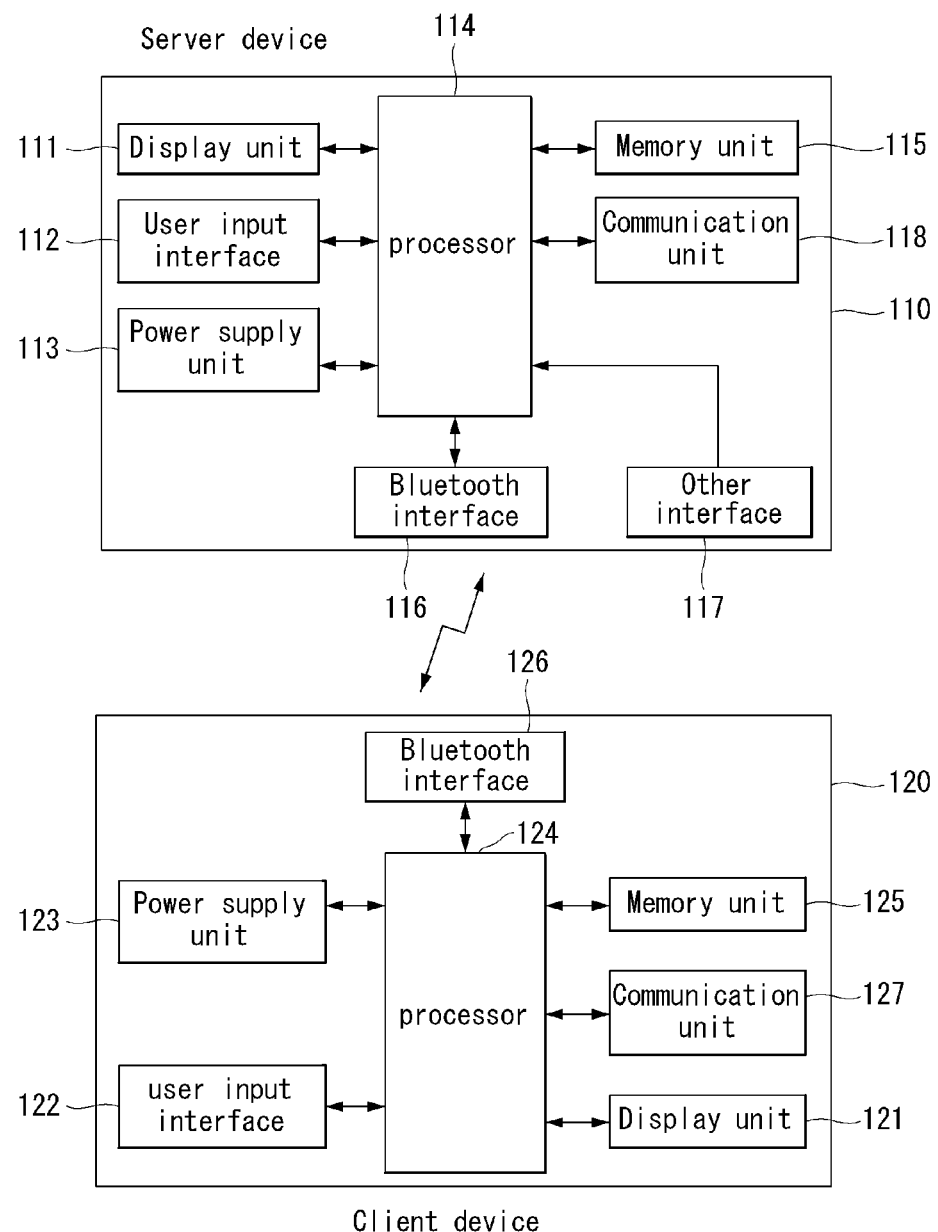
FIG. 2 is an example of an internal block diagram of a device in which the method proposed in the present disclosure is implementable.

FIG. 2 is an example of an internal block diagram of a device in which the method proposed in the present disclosure is implementable.

As illustrated in FIG. 2, a server device includes a display unit 111, a user input interface 112, a power supply unit 113, a processor 114, a memory unit 115, a Bluetooth interface 116, other interface 117, and a communication unit (or transceiver unit) 118.

The display unit 111, the user input interface 112, the power supply unit 113, the processor 114, the memory unit 115, the Bluetooth interface 116, other interface 117, and the communication unit 118 are functionally connected to each other to perform a method proposed in this disclosure.

Also, the client device includes a display unit 121, a user input interface 122, a power supply unit 123, a processor 124, a memory unit 125, a Bluetooth interface 126, and a communication unit (or transceiver unit) 128.

The display unit 121, the user input interface 122, the power supply unit 123, the processor 124, the memory unit 125, the Bluetooth interface 126, other interface 127, and the communication unit 128 are functionally connected to each other to perform a method proposed in this disclosure.

The Bluetooth interfaces 116 and 126 refer to units (or modules) able to transmit data such as a request/a response, a command, a notification, an indication/confirmation message between devices.

The memory units 115 and 126 are units implemented in various types of devices, in which various types of data are stored.

The processors 114 and 124 refer to modules controlling a general operation of the server device or the client device, which control requesting transmission of a message through the Bluetooth interface and other interface and processing a received message therethrough.

The processors 114 and 124 may also be termed a controller, a control unit, and the like.

The processors 114 and 124 may include an application-specific integrated circuit (ASIC), other chip set, a logic circuit and/or data processing unit.

The processors 114 and 124 control the communication units to receive an advertising message from the server device, control the communication unit to transmit a scan request message to the server device and receive a scan response message as a response to the scan request from the server device, and control the communication unit to transmit a connection request message to the server device in order to establish a Bluetooth connection with the server device.

Also, after the Bluetooth LE connection is established through the connection procedure, the processors 114 and 124 control the communication units to read or write data by using an attribute protocol from the server device The memory units 115 and 125 may include a read-only memory (ROM), a random access memory (RAM), a flash memory, a memory card, a storage medium and/or other storage device.

The communication units 118 and 127 may include a baseband circuit for processing a wireless signal. When an embodiment is implemented by software, the aforementioned technique may be implemented as a module (process, function, etc.) performing the aforementioned function. The module may be stored in a memory unit and may be executed by a processor.

The memory units 115 may be present within or outside of the processors 114 and 124, and may be connected to the processors 114 and 124 through various well-known units.

The display units 111 and 121 refer to modules providing status information of the devices, message exchange information, and the like, to the user through a screen.

The power supply units 113 and 123 refer to modules receiving external power or internal power and supplying power required for operations of the respective components under the control of the controllers 114 and 124.

As discussed above, in the BLE technology, a duty cycle is small and power consumption may be significantly reduced through a low data rate.

The user input interfaces 112 and 122 refer to modules providing a user input such as a screen button to the controllers to enable the user to control an operation of the devices.

Figure 3:
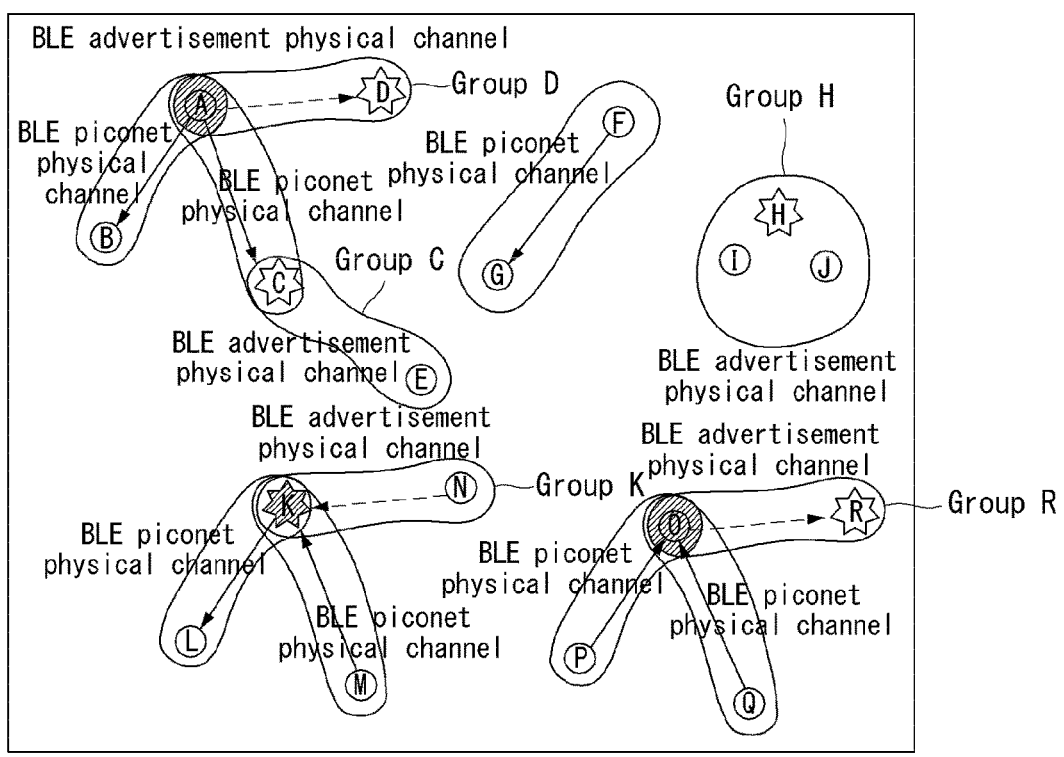
FIG. 3 is a view illustrating an example of a Bluetooth communication architecture to which the methods proposed in the present disclosure is implementable.

FIG. 3 is a view illustrating an example of a Bluetooth communication architecture to which the methods proposed in the present disclosure is implementable.

Referring to FIG. 3, FIG. 3A shows an example of a protocol stack of the Bluetooth BR (Basic Rate)/EDR (Enhanced Data Rate), and FIG. 3B shows an example of a protocol stack of the Bluetooth Low Energy (LE).

Specifically, as illustrated in (a) of FIG. 3, the Bluetooth BR/EDR protocol stack may include an upper controller stack 10 and a lower host stack 20 with respect to a host controller interface (HCI) 18.

The host stack (or host module) 20 refers to hardware for transmitting or receiving a Bluetooth packet to and from a wireless transceiver module receiving a Bluetooth signal of 2.4 GHz, and is connected to a Bluetooth module, the controller stack 10, to control the Bluetooth module and performs an operation.

The host stack 10 may include a PHY layer 12, a Link Controller layer 14 and a Link Manager layer 16.

The PHY layer 12 is the layer of transmitting and receiving a radio signals of 2.4 GHz, and may transmit data by hopping 79 RF channels in the case of using the Gaussian Frequency Shift Keying (GFSK) modulation.

The Link Controller layer 14 plays the role of transmitting a Digital Signal, selects the channel sequence of hopping 1400 times per second, and transmits the time slot of 625 μs length for each channel.

The Link Manager layer 16 controls the entire operations (link setup, control and security) of a Bluetooth connection by utilizing the Link Manager Protocol (LMP).

The link manager layer 16 may perform the following functions.

The link manager layer 16 may perform ACL/SCO logical transport, logical link setup, and control Detach: The link manager layer 16 stops connection and informs a counterpart device about the reason for stopping connection.

The link manager layer 16 performs power control and role switch.

The link manager layer 16 performs security (authentication, pairing, encryption) function.

The host controller interface layer 18 provides an interface between the host module and the controller module to allow the host to provide a command and data to the controller and allow the controller to provide an event and data to the host.

The host stack (or host module) 20 includes a logical link control and adaptive protocol (L2CAP) 21, an attribute protocol (ATT) 22, a generic attribute profile (GATT) 23, a generic access profile (GAP) 24, and a BR/EDR profile 25.

The logical link control and adaptive protocol (L2CAP) 21 may provide a two-way channels for transmitting data to a specific protocol or a profile.

The L2CAP 21 may multiplex various protocols and profiles provided from a Bluetooth higher position.

The L2CAP of the Bluetooth BR/EDR uses a dynamic channel, supports a protocol service multiplexer, retransmission, and a streaming mode, and provides segmentation and reassembly, per-channel flow control, and error control.

The generic attribute profile (GATT) 23 may operate as a protocol how the attribute protocol 22 is used in configuring services. For example, the generic attribute profile 23 may operate how ATT attributes are grouped together with services, and operate to describe features associated with services.

Thus, the GATT 23 and the ATT 22 may use features in order to describe status and services of a device and describe how the features are related and used.

The attribute protocol 22 and the BR/EDR profile 25 define a service (profile) using the Bluetooth BR/EDR and define an application protocol for exchanging data, and the generic access profile (GAP) 24 defines device discovering, connecting a device and security level.

Figure 4:
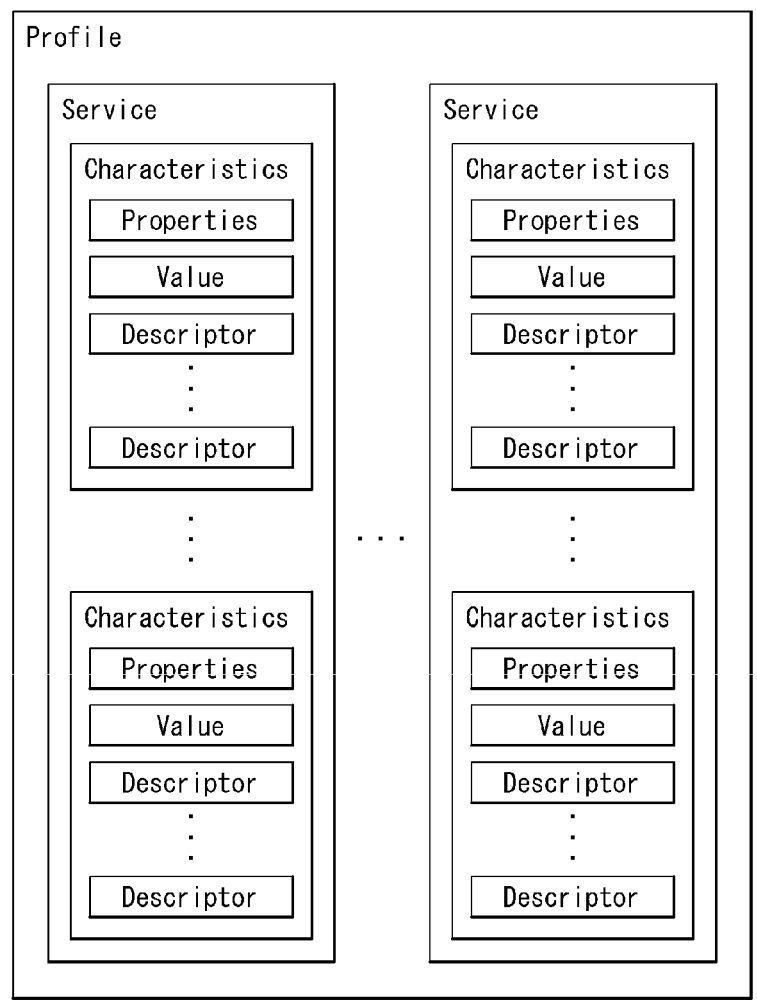
FIG. 4 is a view illustrating an example of a structure of GATT Profile of the Bluetooth low energy.

As illustrated in (b) of FIG. 4, the Bluetooth LE protocol stack includes a controller stack 30 operable to process a wireless device interface for which timing is important, and a host stack 40 operable to process high level data.

First, the controller stack 30 may be implemented by using a communication module that may include a Bluetooth wireless device, for example, a processor module that may include a processing device such as a microprocessor.

The host stack may be implemented as part of an OS operated on a processor module or may be implemented as instantiation of a package on the OS.

In some examples, the controller stack and the host stack may be operated or executed on the same processing device within a processor module.

The controller stack 30 includes a physical layer (PHY) 32, a link layer (LL) 34, and a host controller interface (HCI) 36.

The physical layer (PHY) (wireless transceiver module 32), a layer for transmitting and receiving a 2.4 GHz wireless signal, uses a Gaussian frequency shift keying (GFSK) modulation and a frequency hopping technique including forty RF channels.

The link layer 34 serving to transmit or receive a Bluetooth packet provides a function of generating a connection between devices after performing an advertising and scanning function using three advertising channels, and exchanging data packets of a maximum of 257 bytes through thirty-seven data channels.

The host stack may include the logical link control and the adaptation protocol (L2CAP) 41, the Security Manager (SM) 42, the Attribute Protocol (ATT) 43, the Generic Attribute Profile (GATT) 44, the Generic Access Profile 45 and the LE profile 46. However, the host stack 40 is not limited thereto, but may include other various protocols and profiles.

The host stack multiplexes various protocols and profiles provided from a Bluetooth higher position by using the L2CAP.

First, the L2CAP 41 may provide a single two-way channel for transmitting data to a specific protocol or profile.

The L2CAP 41 may operate to multiplex data between higher layer protocols, segment and reassemble packages, and manage a multicast data transmission.

In the Bluetooth LE, three fixed channels (one for a signaling channel, one for a security manager, and one for an attribute protocol) are basically used, and dynamic channel may be used as necessary.

In contrast, in the BR/EDR, a dynamic channel is basically used, and a protocol service multiplexer, retransmission, streaming mode, and the like, are supported.

The SM 42 is a protocol for certifying a device and providing a key distribution.

The ATT 43 defines a rule for accessing data of a counterpart device by a server-client structure. The ATT 43 includes six types of messages (request, response, command, notification, indication, and confirmation) as follows.

① Request and Response message: A request message is a message for a client device to request specific information from a server device, and the response message, as a response message with respect to the request message, refers to a message transmitted from the server device to the client device.

② Command message: It is a message transmitted from the client device to the server device in order to indicate a command of a specific operation. The server device does not transmit a response with respect to the command message to the client device.

③ Notification message: It is a message transmitted from the server device to the client device in order to notify an event, or the like. The client device does not transmit a confirmation message with respect to the notification message to the server device.

④ Indication and confirmation message: It is a message transmitted from the server device to the client device in order to notify an event, or the like. Unlike the notification message, the client device transmits a confirmation message regarding the indication message to the server device.

In the present invention, when the GATT profile using the attribute protocol (ATT) 43 requests long data, a value regarding a data length is transmitted to allow a client to clearly know the data length, and a characteristic value may be received from a server by using a universal unique identifier (UUID).

The generic access profile (GAP) 45, a layer newly implemented for the Bluetooth LE technology, is used to select a role for communication between Bluetooth LED devices and to control how a multi-profile operation takes place.

Also, the generic access profile (GAP) 45 is mainly used for device discovery, connection generation, and security procedure part, defines a scheme for providing information to a user, and defines types of attributes as follows.

① Service: It defines a basic operation of a device by a combination of behaviors related to data ② Include: It defines a relationship between services ③ Characteristics: It is a data value used in a server ④ Behavior: It is a format that may be read by a computer defined by a UUID (value type).

The LE profile 46, including profiles dependent upon the GATT, is mainly applied to a Bluetooth LE device. The LE profile 46 may include, for example, Battery, Time, FindMe, Proximity, Time, Object Delivery Service, and the like, and details of the GATT-based profiles are as follows.

① Battery: Battery information exchanging method
② Time: Time information exchanging method
③ FindMe: Provision of alarm service according to distance
④ Proximity: Battery information exchanging method
⑤ Time: Time information exchanging method The generic attribute profile (GATT) 44 may operate as a protocol describing how the attribute protocol (ATT) 43 is used when services are configured. For example, the GATT 44 may operate to define how ATT attributes are grouped together with services and operate to describe features associated with services.

Thus, the GATT 44 and the ATT 43 may use features in order to describe status and services of a device and describe how the features are related and used.

Hereinafter, procedures of the Bluetooth low energy (BLE) technology will be briefly described.

The BLE procedure may be classified as a device filtering procedure, an advertising procedure, a scanning procedure, a discovering procedure, and a connecting procedure.

Device Filtering Procedure

The device filtering procedure is a method for reducing the number of devices performing a response with respect to a request, indication, notification, and the like, in the controller stack.

When requests are received from all the devices, it is not necessary to respond thereto, and thus, the controller stack may perform control to reduce the number of transmitted requests to reduce power consumption.

An advertising device or scanning device may perform the device filtering procedure to limit devices for receiving an advertising packet, a scan request or a connection request.

Here, the advertising device refers to a device transmitting an advertisement event, that is, a device performing an advertisement and is also termed an advertiser.

The scanning device refers to a device performing scanning, that is, a device transmitting a scan request.

In the BLE, in a case in which the scanning device receives some advertising packets from the advertising device, the scanning device should transmit a scan request to the advertising device.

However, in a case in which a device filtering procedure is used so a scan request transmission is not required, the scanning device may disregard the advertising packets transmitted from the advertising device.

Even in a connection request process, the device filtering procedure may be used. In a case in which device filtering is used in the connection request process, it is not necessary to transmit a response with respect to the connection request by disregarding the connection request.

Advertising Procedure

The advertising device performs an advertising procedure to perform undirected broadcast to devices within a region.

Here, the undirected broadcast is advertising toward all the devices, rather than broadcast toward a specific device, and all the devices may scan advertising to make an additional information request or a connection request.

In contrast, directed advertising may make an additional information request or a connection request by scanning advertising for only a device designated as a reception device.

The advertising procedure is used to establish a Bluetooth connection with an initiating device nearby.

Or, the advertising procedure may be used to provide periodical broadcast of user data to scanning devices performing listening in an advertising channel.

In the advertising procedure, all the advertisements (or advertisement events) are broadcast through an advertisement physical channel.

The advertising devices may receive scan requests from listening devices performing listening to obtain additional user data from advertising devices. The advertising devices transmit responses with respect to the scan requests to the devices which have transmitted the scan requests, through the same advertising physical channels as the advertising physical channels in which the scan requests have been received.

Broadcast user data sent as part of advertising packets are dynamic data, while the scan response data is generally static data.

The advertisement device may receive a connection request from an initiating device on an advertising (broadcast) physical channel. If the advertising device has used a connectable advertising event and the initiating device has not been filtered according to the device filtering procedure, the advertising device may stop advertising and enter a connected mode. The advertising device may start advertising after the connected mode.

Scanning Procedure

A device performing scanning, that is, a scanning device performs a scanning procedure to listen to undirected broadcasting of user data from advertising devices using an advertising physical channel.

The scanning device transmits a scan request to an advertising device through an advertising physical channel in order to request additional data from the advertising device. The advertising device transmits a scan response as a response with respect to the scan request, by including additional user data which has requested by the scanning device through an advertising physical channel.

The scanning procedure may be used while being connected to other BLE device in the BLE piconet.

If the scanning device is in an initiator mode in which the scanning device may receive an advertising event and initiates a connection request. The scanning device may transmit a connection request to the advertising device through the advertising physical channel to start a Bluetooth connection with the advertising device.

When the scanning device transmits a connection request to the advertising device, the scanning device stops the initiator mode scanning for additional broadcast and enters the connected mode.

Discovering Procedure

Devices available for Bluetooth communication (hereinafter, referred to as "Bluetooth devices") perform an advertising procedure and a scanning procedure in order to discover devices located nearby or in order to be discovered by other devices within a given area.

The discovering procedure is performed asymmetrically. A Bluetooth device intending to discover other device nearby is termed a discovering device, and listens to discover devices advertising an advertising event that may be scanned. A Bluetooth device which may be discovered by other device and available to be used is termed a discoverable device and positively broadcasts an advertising event such that it may be scanned by other device through an advertising (broadcast) physical channel.

Both the discovering device and the discoverable device may have already been connected with other Bluetooth devices in a piconet.

Connecting Procedure

A connecting procedure is asymmetrical, and requests that, while a specific Bluetooth device is performing an advertising procedure, another Bluetooth device should perform a scanning procedure.

That is, an advertising procedure may be aimed, and as a result, only one device may response to the advertising. After a connectable advertising event is received from an advertising device, a connecting request may be transmitted to the advertising device through an advertising (broadcast) physical channel to initiate connection.

Hereinafter, operational states, that is, an advertising state, a scanning state, an initiating state, and a connection state, in the BLE technology will be briefly described.

Advertising State

A link layer (LL) enters an advertising state according to an instruction from a host (stack). In a case in which the LL is in the advertising state, the LL transmits an advertising packet data unit (PDU) in advertising events.

Each of the advertising events includes at least one advertising PDU, and the advertising PDU is transmitted through an advertising channel index in use. After the advertising PDU is transmitted through an advertising channel index in use, the advertising event may be terminated, or in a case in which the advertising device may need to secure a space for performing other function, the advertising event may be terminated earlier.

Scanning State

The LL enters the scanning state according to an instruction from the host (stack).

In the scanning state, the LL listens to advertising channel indices.

The scanning state includes two types: passive scanning and active scanning. Each of the scanning types is determined by the host.

Time for performing scanning or an advertising channel index are not defined.

During the scanning state, the LL listens to an advertising channel index in a scan window duration. A scan interval is defined as an interval between start points of two continuous scan windows.

When there is no collision in scheduling, the LL should listen in order to complete all the scan intervals of the scan window as instructed by the host. In each scan window, the LL should scan other advertising channel index. The LL uses every available advertising channel index.

In the passive scanning, the LL only receives packets and cannot transmit any packet.

In the active scanning, the LL performs listening in order to be relied on an advertising PDU type for requesting advertising PDUs and advertising device-related additional information from the advertising device.

Initiating State

The LL enters the initiating state according to an instruction from the host (stack).

When the LL is in the initiating state, the LL performs listening on advertising channel indices.

During the initiating state, the LL listens to an advertising channel index during the scan window interval.

Connection State

When the device performing a connection state, that is, when the initiating device transmits a CONNECT_REQ PDU to the advertising device or when the advertising device receives a CONNECT_REQ PDU from the initiating device, the LL enters a connection state.

It is considered that a connection is generated after the LL enters the connection state. However, it is not necessary to consider that the connection should be established at a point in time at which the LL enters the connection state. The only difference between a newly generated connection and an already established connection is a LL connection supervision timeout value.

When two devices are connected, the two devices play different roles.

An LL serving as a master is termed a master, and an LL serving as a slave is termed a slave. The master adjusts a timing of a connecting event, and the connecting event refers to a point in time at which the master and the slave are synchronized.

Hereinafter, packets defined in an Bluetooth interface will be briefly described. BLE devices use packets defined as follows.

Packet Format

The LL has only one packet format used for both an advertising channel packet and a data channel packet.

Each packet includes four fields of a preamble, an access address, a PDU, and a CRC.

When one packet is transmitted in an advertising physical channel, the PDU may be an advertising channel PDU, and when one packet is transmitted in a data physical channel, the PDU may be a data channel PDU.

Advertising Channel PDU

An advertising channel PDU has a 16-bit header and payload having various sizes.

A PDU type field of the advertising channel PDU included in the heater indicates PDU types defined in Table 1 below.

TABLE 1

| PDU Type | Packet Name |
| --- | --- |
| 0000 | ADV_IND |
| 0001 | ADV_DIRECT_IND |
| 0010 | ADV_NONCONN_IND |
| 0011 | SCAN_REQ |
| 0100 | SCAN_RSP |
| 0101 | CONNECT_REQ |
| 0110 | ADV_SCAN_IND |
| 0111-1111 | Reserved |

Advertising PDU

The following advertising channel PDU types are termed advertising PDUs and used in a specific event.

ADV_IND: Connectable undirected advertising event

ADV_DIRECT_IND: Connectable directed advertising event

ADV_NONCONN_IND: Unconnectable undirected advertising event

ADV_SCAN_IND: Scannable undirected advertising event

The PDUs are transmitted from the LL in an advertising state, and received by the LL in a scanning state or in an initiating state.

Scanning PDU

The following advertising channel DPU types are termed scanning PDUs and are used in a state described hereinafter.

SCAN_REQ: Transmitted by the LL in a scanning state and received by the LL in an advertising state.

SCAN_RSP: Transmitted by the LL in the advertising state and received by the LL in the scanning state.

Initiating PDU

The following advertising channel PDU type is termed an initiating PDU.

CONNECT_REQ: Transmitted by the LL in the initiating state and received by the LL in the advertising state.

Data Channel PDU

The data channel PDU may include a message integrity check (MIC) field having a 16-bit header and payload having various sizes.

The procedures, states, and packet formats in the BLE technology discussed above may be applied to perform the methods proposed in this disclosure.

FIG. 4 is a view illustrating an example of a structure of GATT Profile of the Bluetooth low energy.

Referring to FIG. 4, the structure for exchange of Profile Data of the Bluetooth Low Energy is shown.

Specifically, the GATT defines a method for exchanging data using a service between Bluetooth LE devices and a characteristic.

In general, a peripheral device (for example, a sensor device) serves as a GATT server, and has definition regarding a service and a characteristic.

In order to read or write data, a GATT client sends a data request to the GATT server, and every operation (transaction) is started by the GATT client and a response is received from the GATT server.

Figure 5:
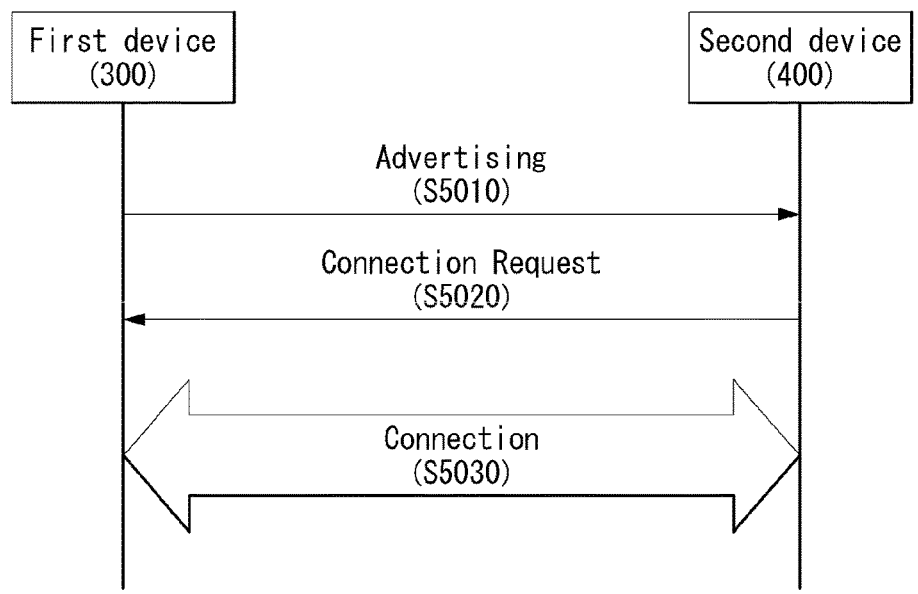
FIG. 5 is a flowchart illustrating a method for forming a connection between devices using the Bluetooth Low Energy (LE).

A GATT-based operational structure used in the Bluetooth LE may be a vertical structure as illustrated in FIG. 5 on the basis of a profile, a service, and a characteristic.

The profile includes one or more services, and the services may include one or more characteristics or other services.

The service serves to divide data into logical units and may include one or more characteristics or other services, each of the services has a 16-bit or 128-bit identifier called a universal unique identifier (UUID)).

The characteristic is the lowermost unit in the GATT-based operational structure. The characteristic includes only one data, and has a 16-bit or 128-bit UUID, similar to the service.

The characteristic is defined by values of various types of information, and in order to hold each information, an attribute may be required for each information. The characteristic may use several continuous attributes.

The attribute has four components and has meanings as follows.

handle: Address of attribute

Type: Type of attribute

Value: Value of attribute

Permission: Right to access attribute

The present invention proposes a method for controlling a device by acquiring the association information and the information in relation to a controllable operation of a device which is to be controlled by a control device through the GATT.

FIG. 5 is a flowchart illustrating a method for forming a connection between devices using the Bluetooth Low Energy (LE).

As shown in FIG. 5, for the Bluetooth LE connection between a first device 300 and a second device 400, the first device 300 transmits an Advertising Message to the second device 400 (step, S5010).

In this case, the Advertising Message may be transmitted in the broadcast scheme or the unicast scheme.

As described above, the Advertising Message is used for providing the information of a device to another device by utilizing the Bluetooth LE, and may include various types of information such as the service information provided by the device, the user information, and so on.

The second device 400 may discover the first device 300 through the Advertising Message.

After identifying the information included in the Advertising Message, the second device 400 transmits a connection request message for connecting the Bluetooth LE connection to the first device 300 (step, S5020), and the first device 300 and the second device 400 establish a Bluetooth Low Energy (LE) connection (step, S5030).

Such a method has a disadvantage that a user is unable to control the connection establishment and it is impossible to check a PIN number and to control a connection configuration in case that a User Interface (UI) is not existed in the first device 300 and/or the second device 400.

Accordingly, in order to solve the problem, the present invention proposes a method for controlling the first device 300 and the second device 400 by using a third device.

Figure 6:
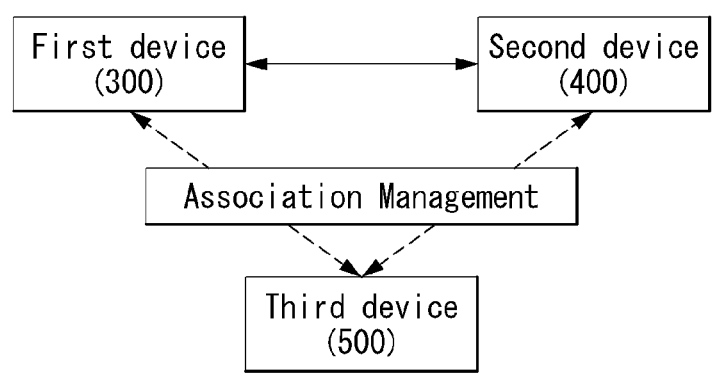
FIG. 6 is a view schematically illustrating a method for controlling another device through a control device proposed in the present disclosure.

FIG. 6 is a view schematically illustrating a method for controlling another device through a control device proposed in the present disclosure.

As shown in FIG. 6, a third device 500 is required to control the operation between the first device 300 and the second device 400, and the third device 500 requires a new control protocol in order to control the association of the first device 300 and the second device 400.

Hereinafter, the control device for controlling the operation of the first device 300 and the second device 400 is referred to as the third device 500.

In this case, in order to control the operation of the devices, the third device 500 should know the information (e.g., interface information, service information, etc.) of the devices.

Figure 7:
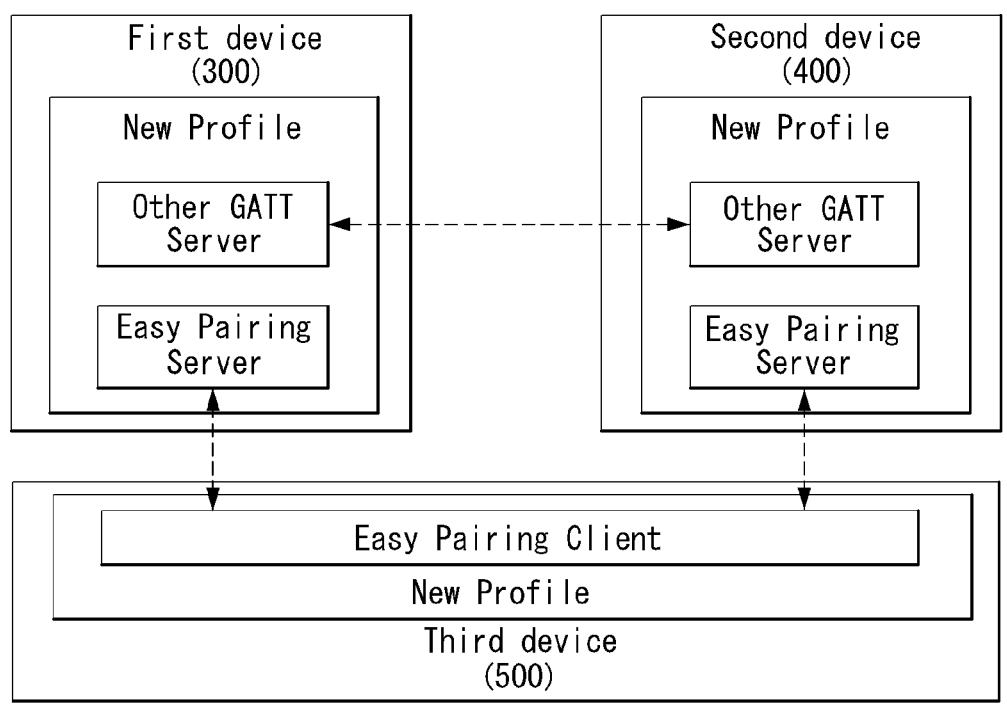
FIGS. 7 and 8 are views illustrating an example of a profile structure for providing a service for controlling a device proposed in the present disclosure.
Figure 8:
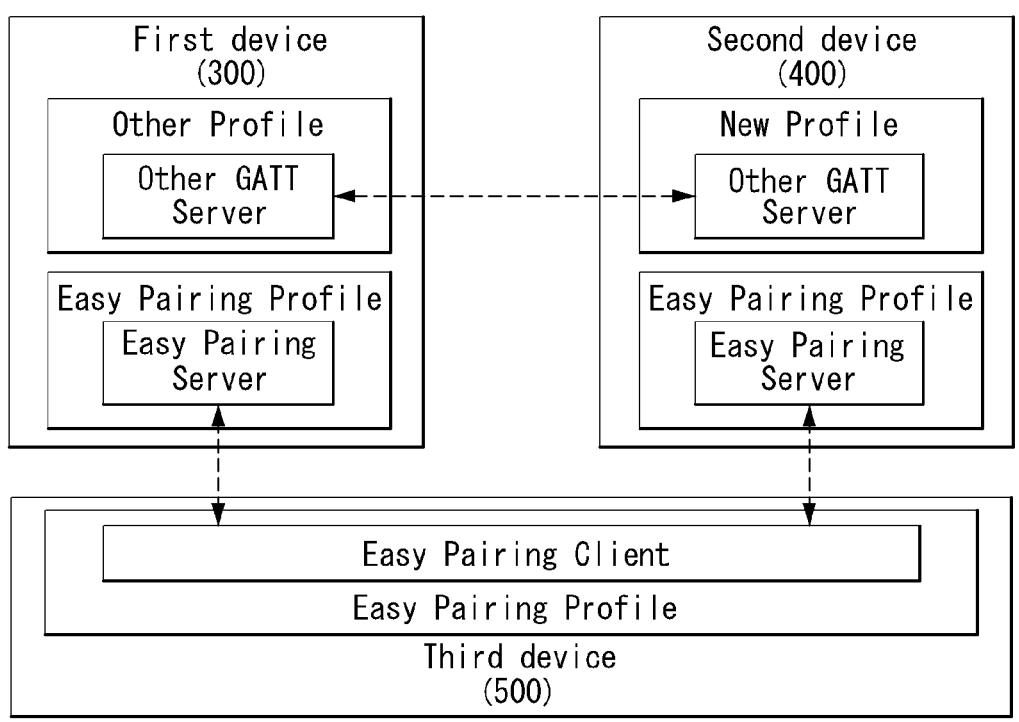

FIGS. 7 and 8 are views illustrating an example of a profile structure for providing a service for controlling a device proposed in the present disclosure.

Referring to FIG. 7 and FIG. 8, the service for a control device to control other devices may be included in the profile of other services together, or defined by a separate profile.

Hereinafter, the service for the control device to control other devices is called an Easy Pairing Service.

The third device 500, which is the control device, may control other devices through the Easy Pairing Service. For example, the third device 500 may control the operations related to the association (e.g., connection, pairing or bonding) between the first device 300 and the second device 400 through the Easy Pairing Service.

In this case, the Easy Pairing Service may be included in the profile of other services as shown in FIG. 7, or defined by a separate profile as shown in FIG. 8.

In the case that the Easy Pairing Service is included in the profile of a specific service, not defined by a separate profile, as shown in FIG. 7, there is an advantage of being easy to describe the operation of an application.

However, the Easy Pairing Service is unable to be applied up to the service of profile that does not include the Easy Pairing Service, but the role between devices should be clearly defined.

As shown in FIG. 8, in the case that the Easy Pairing Service is defined by a separate profile, there is an advantage that the server/client structure is compatible in the profile level, and the Easy Pairing Service may be extendedly applied to other profile.

Figure 9:
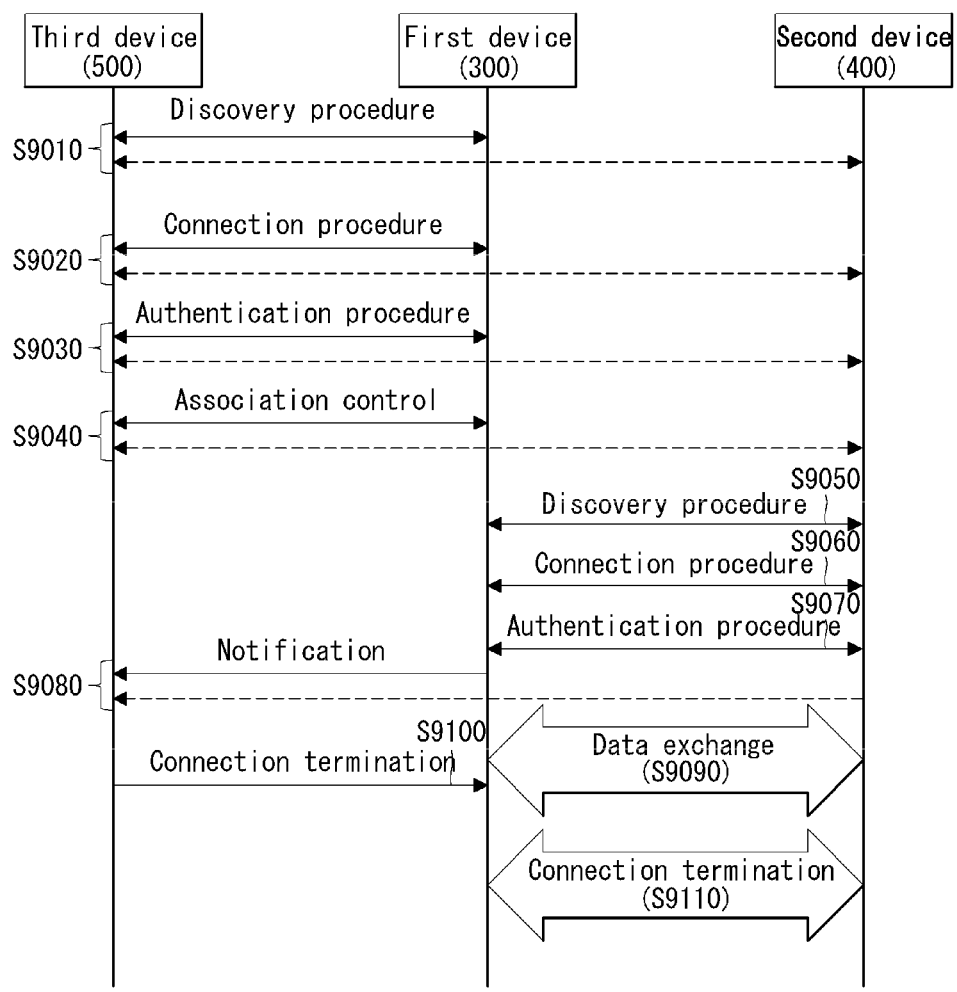
FIG. 9 is a flowchart illustrating an example of entire message transmission procedures for controlling a device proposed in the present disclosure.

FIG. 9 is a flowchart illustrating an example of entire message transmission procedures for controlling a device proposed in the present disclosure.

Referring to FIG. 9, the third device 500 may control the first device 300 or the second device 400 through the Bluetooth connection with the first device 300 or the second device 400.

Particularly, the third device 500 discovers the first device 300 and/or the second device 400 through the Discovery Procedure (step, S9010).

The Discovery Procedure may be performed through the Advertising Message transmitted by the first device 300 and/or the second device 400 as described above, and the Advertising Message may include the information (e.g., device ID and device address) of the device that transmits the Advertising Message, the service information that represents the service that may be provided, and the like.

In this case, the Advertising Message may include the service information that represents whether the first device 300 and/or the second device 400 support(s) the Easy Pairing Service.

The third device 500 that discovers the first device 300 and/or the second device 400 through the Discovery Procedure may form a Bluetooth connection through the connection procedure with the discovered device (step, S9020).

Later, through an authentication procedure, the third device 500 performs device authentication with the first device 300 and/or the second device 400 (step, S9030).

The third device 500 that completes the authentication of the device through the authentication procedure may control the operation in relation to the association with the first device 300 and/or the second device 400 through the Association Control with the first device 300 and/or the second device 400 (step, S9040).

In this case, the third device 500 may instruct the first device 300 and/or the second device 400 to perform overall operations for a specific state through the association control.

For example, the third device 500 may instruct the first device 300 to establish a connection with the second device 400 through the association control step, S9040.

The first device 300 and/or the second device 400 instructed to establish the connection by the third device 500 may establish the connection with the first device 300 and/or the second device 400 through the discovery procedure S9050, the connection procedure S9060 and the authentication procedure S9070.

Later, the first device 300 and/or the second device 400 may notify that the connection is established to the third device 500 by transmitting a Notification message to the third device 500 (step, S9080).

The first device 300 and the second device 400 may perform the data transmission and reception through the established connection (step, S9090).

Later, the first device 300 may terminate the connection with the second device when the first device 300 receives the Connection Termination message that indicates to terminate the connection from the third device 500 (steps, S9100 and S9110).

Through such a method, the third device 500 may control the operations of the first device 300 and/or the second device 400.

Figure 10:
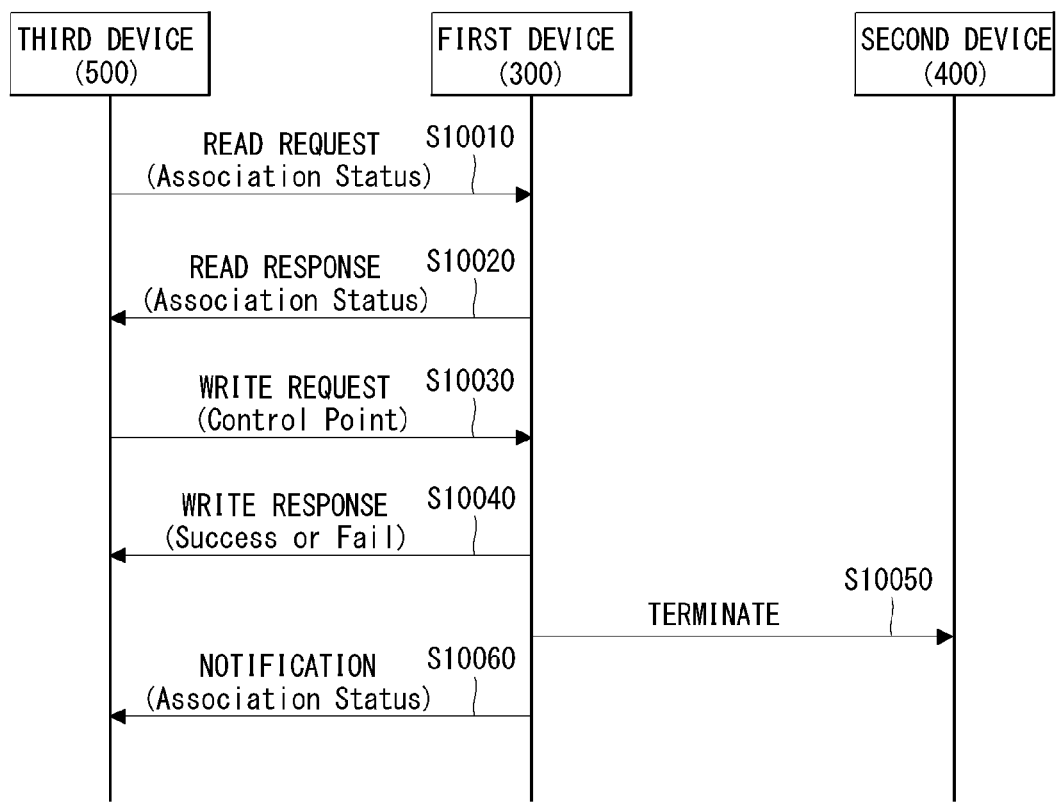
FIG. 10 is a flowchart illustrating an example of a method for acquiring association relationship information of a device proposed in the present disclosure and controlling the device.

FIG. 10 is a flowchart illustrating an example of a method for acquiring association relationship information of a device proposed in the present disclosure and controlling the device.

First, it is assumed that the third device 500, and the first device 300 and the second device 400 are connected through the Bluetooth connection forming procedure described above.

Referring to FIG. 10, the third device 500 that is a control device may receive status information indicating a current association status of the first device 300 with other devices, and may control the first device based on the received status information.

Specifically, the third device 500 transmits, to the first device 300, a read request message of requesting the association status information indicating the current association status of the first device 300 to check the association relationship of the first device 300 with other devices.

The association status information is information indicating an association status with at least one device with which the first device 300 is currently associated, and is stored in the characteristic of the first device 300.

Hereinafter, the characteristic in which the association status is stored is referred to as an Association Status characteristic.

The structure of the Association Status characteristic will be described below.

The first device 300 that receives the request for the association status information transmits a read response message including the association status information (first association status information) stored in the Association Status characteristic to the third device 500 (S10020).

The third device 500 that receives the read response message may know the current association status of the first device 300.

Based on the association status information, the third device transmits, to the first device, a write request message of requesting writing of a characteristic for instructing the first device to perform a specific operation related to the association status (S10030).

In this case, the write request message may include control information including information related to the specific operation.

Hereinafter, the characteristic for controlling a specific device in the present disclosure is referred to as a control point characteristic.

The first device 300 that receives the write request message transmits a write response message to the third device 500 in response to the write request message (S10040).

In this case, when the first device 300 successfully performs writing of the specific operation instructed by the third device in its control point characteristic, the first device 300 transmits a write response message indicating the write success, and when failed, the first device 300 transmits a write response message indicating the write fail.

When the writing of the specific operation is successful, the first device 300 may perform the specific operation, and may include result information indicating whether or not the specific operation has been performed in the write response message.

For example, when the first device 300 is paired with or connected to the second device 400, and when the third device 500 transmits, to the second device 400, a write request message of instructing the termination of pairing with or connection to the second device 400, the first device 300 may transmit a termination message to terminate the pairing or connection with the second device 400 (S10050).

Thereafter, since the association status with the second device 400 is changed, the first device 300 transmits a notification message to inform the third device 500 (S10060).

In this case, the notification message may include association status information (second association status information) indicating a changed association status.

Through such a method, the third device 500 may know the current association status of the first device 300 with one or more devices, and thus, the first device 300 may control the association status of the first device 300 by instructing the first device 300 to perform an operation related to the association status.

FIGS. 11 to 14 are views illustrating an example of a characteristic for controlling a device proposed in the present disclosure.

FIG. 11 shows an example of the Association Status Characteristic described in FIG. 10. As shown in FIG. 11A, the Association Status Characteristic may include a Number of Associations field, a Peer device ID field, a Bearer field, and a Status field.

The Number of Associations field is a field indicating the number of devices existing in the association status with the first device 300. The number of the Peer device ID field, the Bearer field, and the Status field may be determined according to the value of the Number of Associations field.

For example, when the Number of Associations field value is 1, there may be only one Peer device ID field, Bearer field, and Status field, respectively, and when the Number of Associations field value is n, there may be n Peer device ID Field, Bearer field, and Status field, respectively.

The Peer device ID field is a field indicating an address of a peer device associated with the first device. In this case, the address of the peer device may be a public address type or a random address type according to a transmission type.

The Bearer field is a field indicating a connection type with the peer device. For example, when connected to the peer device through the Bluetooth BR/EDR, the Bearer field is set to a value indicating the Bluetooth BR/EDR. When connected to the peer device through the Bluetooth LE, the Bearer field is set to a value indicating Bluetooth LE.

The Status field is a field indicating an association status with the peer device, and may be configured as shown in FIG. 11B. For example, when the 0th bit is set to 1 in FIG. 11B, the Status filed indicates that the first device is connected to the peer device.

The third device may request the association status information stored in the Association Status Characteristic shown in FIG. 11 to know the number of peer devices with which the first device is associated and the connection type and association type in which the first device is connected to each peer device.

FIG. 12A is a view illustrating an example of association status information included in a notification message transmitted from the first device to the third device when the association status between the first device and the peer device is changed.

As shown in FIG. 12A, the association status information may include a Peer Device ID field, a Bearer field, and a Status field.

The Peer Device ID field is a field indicating the address of the peer device whose status is changed, and may be a public address type or a random address type according to the transmission type.

The Bearer field is a field indicating a connection type with the peer device whose status is changed, and the Status field is a field indicating the changed association status, which may be configured as shown in FIG. 12B.

FIGS. 13A and 13B are views illustrating another example of the changed association status information.

FIG. 13A illustrates an example of association status information for notifying each changed association status when being connected to the peer device through the Bluetooth LE and the Bluetooth BR/EDR.

As shown in FIG. 13, the association status information may include a Peer Device ID field, an LE Status field, and a BR/EDR Status field.

The LE Status field is a field for indicating an association status of the changed Bluetooth LE when the Bluetooth LE state with the peer device is changed.

The BR/EDR Status field is a field for indicating an association status of the changed Bluetooth BR/EDR when the Bluetooth BR/EDR state with the peer device is changed.

FIG. 13B shows association status information for indicating each association status when a plurality of associations are formed with the first device through one peer device ID.

For example, when the first device is associated with the peer device through various association types such as Bluetooth BR/EDR Legacy, BR/EDR SSP, BR/EDR Secure Connection, and LE Legacy, an example of the association status information for notifying of each change association status is shown.

The association status information may include a Peer Device ID field, a Number of Bearer field, a Bearer field, and a Status field.

In this case, the Bearer field and the Status field may be included in plurality according to a value of the Number of Bearer field.

For example, when the value of the Number of Bearer field is n, n Bearer fields and n Status fields may be included.

The Number of Bearer field is a field indicating the number of associations that the first device and the peer device form with an address of the peer device indicated by the Peer Device ID.

The Bearer field is a field indicating a connection type with the peer device whose status is changed, and the Status field is a field indicating a changed association status.

FIG. 14 is a view illustrating an example of the control point characteristic and control information described above.

FIG. 14A shows an example of the Control Point and the control information, and FIG. 14B shows an example of Opcode and Operand included in the Control Point and the control information.

As shown in FIG. 14A, the control information transmitted by the third device and the Control Point characteristic of the first device may include an Opcode field, a Peer Device ID field, a Bearer field, and an Operation Mode and Procedure field.

The Opcode means an operation code indicating a specific operation instructed by the third device.

The Peer Device ID field is a field indicating an address of the peer device of the specific operation, and may be a public address type or a random address type according to the transmission type.

The Bearer field is a field indicating a connection type with the peer device, and the Operation Mode and Procedure field is a field indicating an operation mode and a procedure for performing the specific operation.

FIG. 14B shows an example of the Opcode field and an example of an Operand according to the Opcode.

In this case, the Operand indicates fields to be together transmitted later according to the value of the Opcode field. For example, when the Opcode has a value indicating Make a Connection that is an operation for establishing a connection, the Peer Device field, the Bearer field, and the Connection Procedure field may be transmitted together.

However, when the Opcode indicates a value of Make a Pairing that is an operation of forming a pairing, only the Peer Device field may be transmitted together.

Thus, the third device may transmit the control information of FIG. 14 to request writing of the value of the control information in the Control point characteristic of the first device, thereby instructing the first device to perform the specific operation included in the control information.

FIG. 15 is a view illustrating another example of the Opcode and the Operand.

Figure 16:
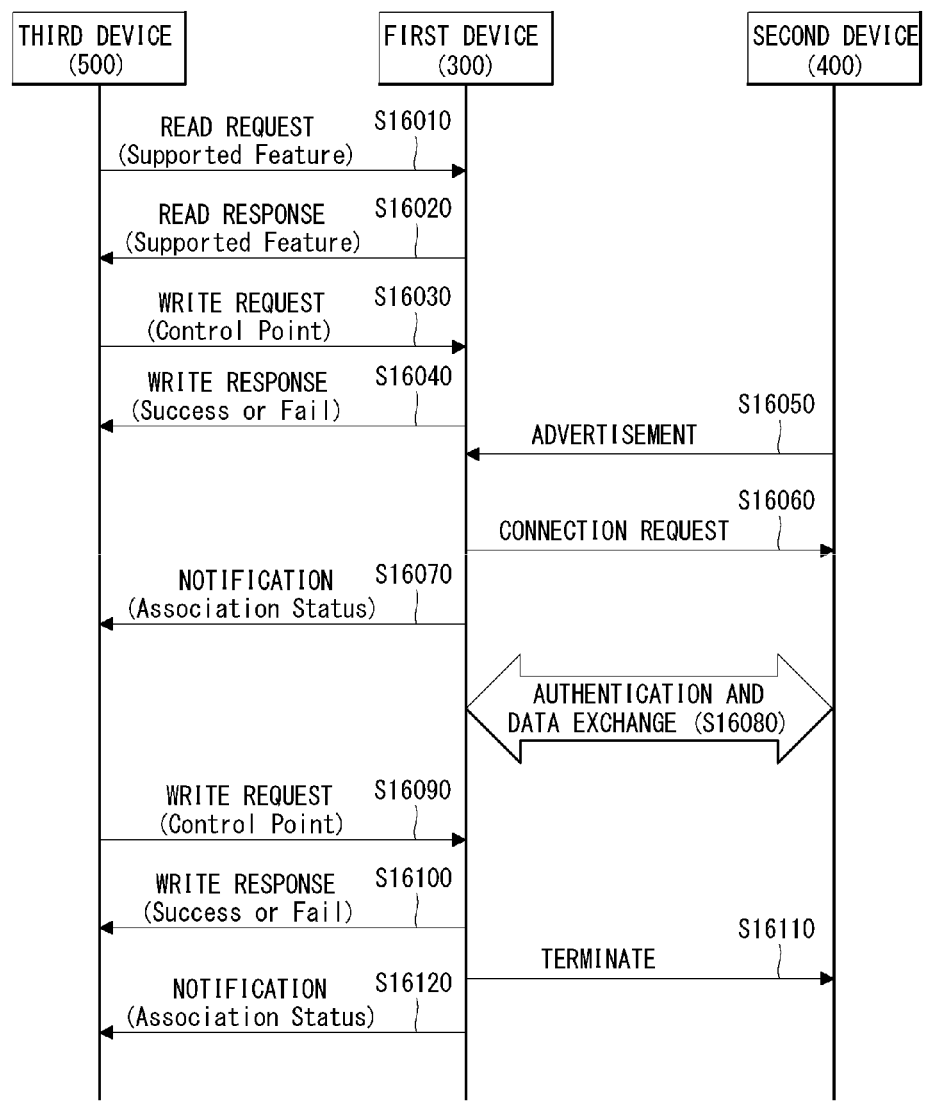
FIG. 16 is a flowchart illustrating an example of a method for acquiring information related to the controllable operation of a device proposed in the present disclosure and controlling the device.

FIG. 16 is a flowchart illustrating an example of a method for acquiring information related to the controllable operation of a device proposed in the present disclosure and controlling the device.

First, it is assumed that the third device 500, the first device 300, and the second device 400 are connected through the Bluetooth connection forming procedure described above.

Referring to FIG. 16, the third device 500, which is a control device, may acquire information related to controllable operations of the first device 300 and control the first device based on the acquired information.

Specifically, the third device 500 transmits a read request message requesting supported feature information indicating controllable operations supported by the first device 300 to control the first device 300 (S16010).

The supported feature information is stored in the characteristic of the first device 300.

Hereinafter, the characteristic in which the supported feature information is stored in the present disclosure is referred to as a Supported Feature characteristic.

The structure of the Supported Feature characteristic will be described below.

The first device 300 that receives a request for the supported feature information transmits a read response message including the supported feature information stored in the Supported Feature characteristic to the third device 500 (S16020).

The third device 500 that receives the read response message may know the controllable operations of the first device 300.

The third device transmits a write request message for requesting the first device to write a Control Point characteristic for instructing the specific device based on the supported feature information (S16030).

In this case, the write request message may include control information including information related to the specific operation.

The first device 300 that receives the write request message transmits a write response message to the third device 500 in response to the write request message (S16040).

In this case, when the first device 300 successfully performs writing of the specific operation instructed by the third device in its control point characteristic, the first device 300 transmits a write response message indicating the write success, and when failed, the first device 300 transmits a write response message (first write response message indicating the write fail.

When the writing of the specific operation is successful, the first device 300 performs the specific operation.

For example, when the third device 500 instructs the first device 300 to form a connection with the second device through the control information, the first device 300 may form a connection with the second device 400.

That is, the first device 300 may detect the second device 400 by receiving an advertisement message transmitted from the second device 400 (S16050), and transmits a connection request message for connection establishment to the second device (S16060).

Thereafter, the first device 300 notifies the third device 500 that a connection with the second device 400 has been established through a notification message including the association status information described in FIGS. 10 to 15 (S16070).

Thereafter, the first device 300 and the second device 400 perform a device authentication procedure to exchange data when the devices 300 and 400 are authenticated (S16080).

When the third device desires to terminate the connection between the first device and the second device, the third device transmits a write request message including control information instructing termination of connection with the second device to the first device 300 (S16090).

The first device 300 that receives the write request message transmits a write response message to the third device 500 in response to the write request message (S16100).

In this case, when the first device 300 successfully performs writing of the connection termination operation instructed by the third device in its control point characteristic, the first device 300 transmits a write response message indicating the write success, and when failed, the first device 300 transmits a write response message indicating the write fail.

The first device 300 may terminate the connection with the second device 400 by transmitting a terminate message for terminating the connection to the second device 400 (S16110).

Since the association status between the first device 300 and the second device 400 is changed due to the termination of the connection, the first device 300 may inform the third device 500 through a notification message including the association status information described in FIGS. 10 to 15 that the connection with the second device 400 is terminated (S16120).

Through such a method, the third device 500 may know the controllable operations supported by the first device 300, and thereby may instruct the first device 300 to perform only the controllable operations.

FIGS. 17 to 21 are views illustrating another example of a characteristic for providing information related to the controllable operation of a device proposed in the present disclosure.

FIG. 17A illustrates an example of the supported feature information and the Supported Feature characteristic. As shown in FIG. 17A, the supported feature information and the Supported Feature characteristic may include a Supported Bearer field, a Device Roles field, and an Operation Modes and Procedures field.

The Supported Bearer field is a field indicating a connection type that the first device can support, and may be configured as shown in FIG. 17B. For example, when the first device supports Bluetooth BR/EDR and does not support Bluetooth LE, the 0th field of FIG. 17B is set to 1, and the first field is set to 0.

The Device Roles field is a field indicating controllable roles of the device supported by the first device, and may be configured as shown in FIG. 17C.

In this case, the roles of the device may be distinguished according to the connection type. Here, a supported role may be set to '1', and a non-supported role may be set to '0'. Also, when the first device supports a plurality of roles, a plurality of bits may be set to '1'.

The Operation Modes and Procedures field is a field indicating controllable operation modes and procedures supported by the first device, and may be configured as shown in FIGS. 18 to 21.

The controllable operation modes and procedures may be distinguished according to the connection type. FIGS. 18 and 19 show an example of operation modes and procedures that can be controlled in the Bluetooth BR/EDR, and FIGS. 20 and 21 show an example of operation modes and procedures that can be controlled in the Bluetooth LE.

The first device may notify the third device of the controllable operation modes and procedures supported by itself, by setting and transmitting a bit indicating the operation mode and procedure supported by itself to '1'.

Figure 22:
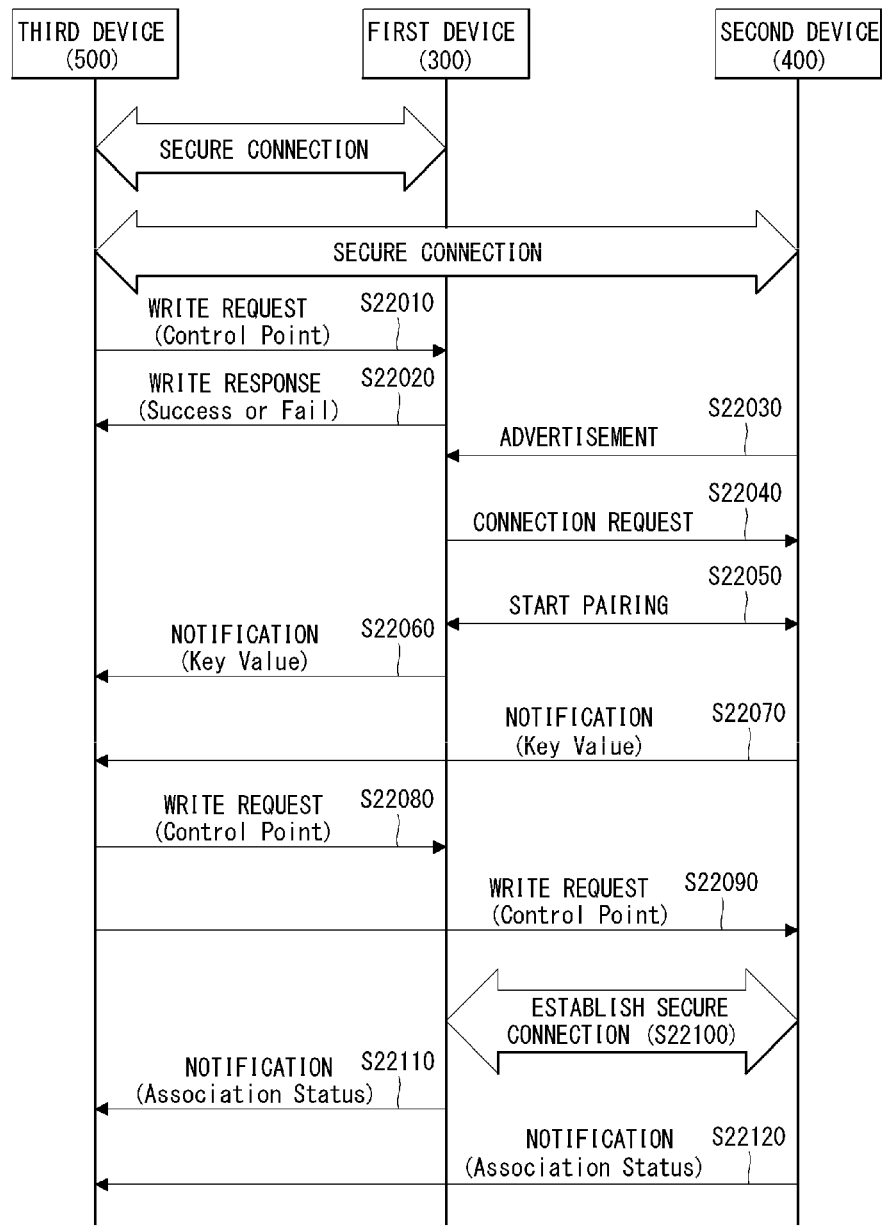

FIGS. 22 and 23 are views illustrating an example of a method and characteristic for forming a secure connection between devices through a control device proposed in the present disclosure.

Referring to FIG. 22 and FIG. 23, the third device 500, which is a control device, controls a device such that a secure connection can be established between the first device 300 and the second device 400.

First, it is assumed that a Bluetooth connection and a secure connection are established between the third device 500 and the first device 300 and between the third device 500 and the second device 400.

The third device 500 having a secure connection with the first device 300 and the second device 400 transmits a write request message of requesting the writing of the control point characteristic to instruct the first device 300 to establish a connection with the second device 400 (S22010).

In this case, the write request message may include control information instructing the connection establishment as described above.

When the first device 300 receiving the write request message succeeds in the writing of the control point characteristic, a write response message indicating the write success is transmitted. Otherwise, the procedure is terminated, and a write response message indicating the write failure is transmitted (S22020).

When the first device 300 succeeds in the writing of the control point characteristic according to the instruction of the third device, the first device 300 performs a procedure for establishing a connection with the second device 400.

Specifically, the first device 300 receives an advertisement message transmitted from the second device 400, searches for the second device 400 (S22030), and transmits a connection request message to the second device 400 (S22040).

Thereafter, the first device 300 and the second device 400 may start a pairing procedure (S22050), and may establish a secure connection through a numeric comparison method.

Specifically, the first device 300 and the second device 400 transmit a notification message including a key value to the third device 500 in order to establish the secure connection by performing the pairing procedure (S22060, S22070).

The key value, which is a value included in the key value characteristic of the first device 300 and the second device 400 as shown in FIG. 23A, may mean a value for establishing a secure connection through a method such as a numeric comparison method or a passkey entry method.

The third device 500 compares a first key value transmitted by the first device 300 with a second key value transmitted by the second device 400.

If the key values do not match, then the third device 500 transmits a message indicating that the key values do not match to the first device 300 and the second device 400, and a secure connection is not established between the first device 300 and the second device 400.

However, if the key values match each other, then the third device 500 transmits a write request message for requesting writing of matching of the key values and writing of the control point characteristic to instruct the first device 300 and the second device 400 to establish the secure connection (S22080, S22090).

In this case, an Opcode written in the Control Point characteristic and the control information included in the write request message is an Opcode indicating the operation for establishment of the secure connection and matching of key values.

Hereinafter, the Opcode indicating the operation for establishment of the secure connection and matching of key values is referred to as a pairing confirmation as shown in FIG. 23B.

The first device 300 and the second device 400, which are instructed to establish a secure connection from the third device 500, establish a secure connection, and transmit a notification message including the changed association status information to the third device (S22100, S22110, and S22120).

Through such a method, the third device 500 may establish a secure connection through a numeric comparison method be configured even when the first device 300 and/or the second device 400 has no proposed UI (e.g., when there is no output unit or input unit) or no UI.

Figure 24:
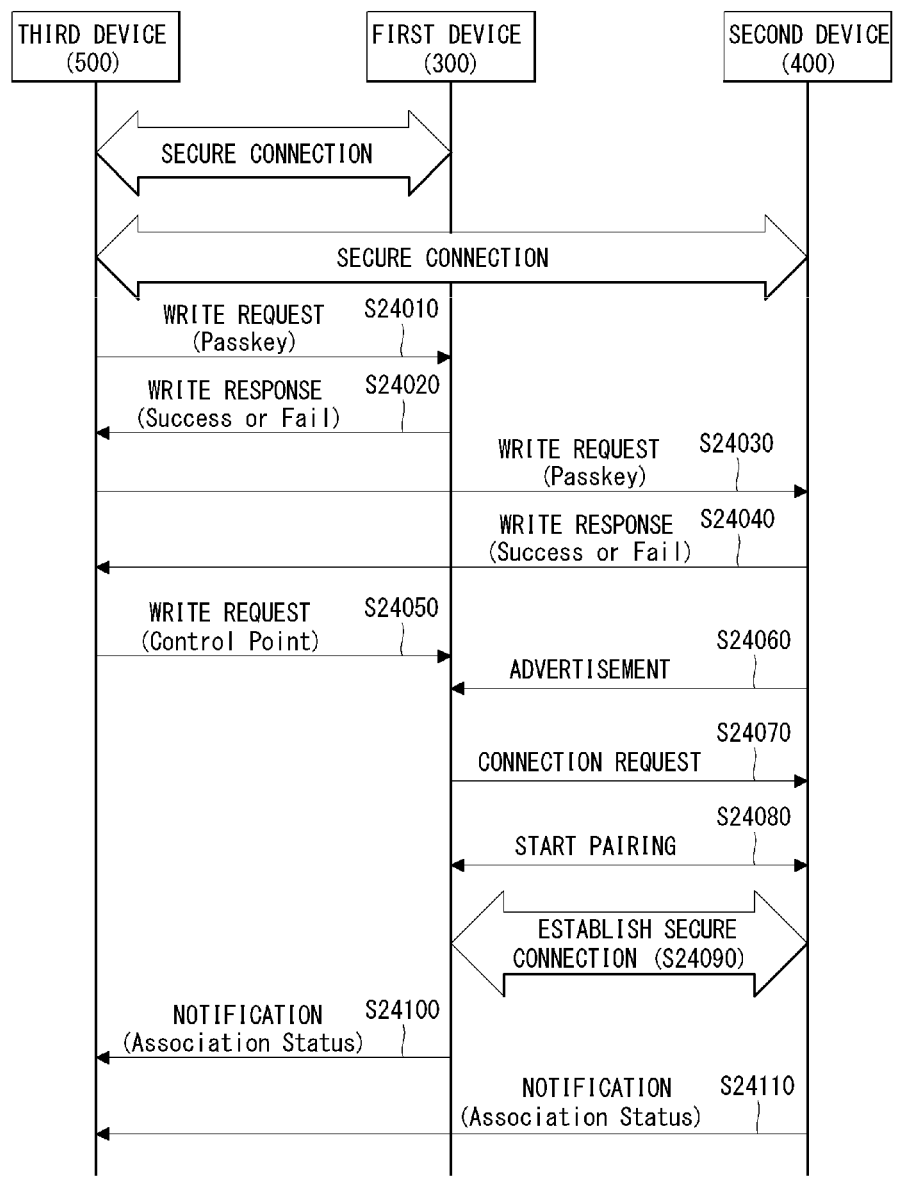
FIG. 24 is a flowchart illustrating another example of a method for forming a secure connection between devices through a control device proposed in the present disclosure.

FIG. 24 is a flowchart illustrating another example of a method for forming a secure connection between devices through a control device proposed in the present disclosure.

Referring to FIG. 24, the third device 500 may control the first device 300 and the second device 400 to establish a secure connection through a passkey input method.

The pass key input method means a method of establishing a secure connection by inputting the same value among devices, and in this case, the input value is called a pass key.

First, it is assumed that a Bluetooth connection and a secure connection are established between the third device 500 and the first device 300 and between the third device 500 and the second device 400.

The third device 500 may transmit a write request message for requesting writing of a pass key in the key value of the first device 300 such that the first device 300 can establish a secure connection through the pass key input method (S24010).

In this case, the write request message may include the pass key value (first pass key).

The first device 300 that receives the write request message transmits a write response message to the third device 500 in response to the write request message (S24020).

In this case, when the first device 300 succeeds in writing the pass key in its Kay Value characteristic, the first device 300 transmits a write response message indicating the write success, and when failed, transmits a write response message indicating the write failure.

The third device 500 also transmits a write request message for requesting the second device 400 to write the same pass key as the first device 300 in the key value characteristic (S24030).

In this case, the write request message may include the pass key value (second pass key).

The second device 400 that receives the write request message transmits a write response message to the third device 500 in response to the write request message (S24040).

In this case, when the second device 400 succeeds in writing the pass key in its Kay Value characteristic, the second device 400 transmits a write response message indicating the write success, and when failed, transmits a write response message indicating the write failure.

Since the third device 500 inputs the same pass key value into the key value characteristics of the first device 300 and the second device 400, the third device 500 may instruct the first device 300 and the second device 400 to establish a connection and establish a secure connection through the pass key input method.

That is, the third device 500 transmits a write request message for requesting writing of the control point characteristic in order to instruct the first device 300 to establish a connection with the second device 400 (S24050).

In this case, the write request message may include control information instructing the connection establishment as described above.

When the first device 300 receiving the write request message succeeds in the writing of the control point characteristic, a write response message indicating the write success is transmitted. Otherwise, the procedure may be terminated, and a write response message indicating the write failure may be transmitted When the first device 300 succeeds in the writing of the control point characteristic according to the instruction of the third device, the first device 300 performs a procedure for establishing a connection with the second device 400.

Specifically, the first device 300 receives an advertisement message transmitted from the second device 400, searches for the second device 400 (S24060), and transmits a connection request message to the second device 400 (S24070).

Thereafter, the first device 300 and the second device 400 may start a pairing procedure (S24080), and may establish a secure connection through a numeric comparison method because the same pass key value is inputted (S24090).

Since the association status of the first device 300 and the second device 400 is changed, the first device 300 and the second device 400 transmit a notification message including the changed association status information to the third device 500 (S24100, S24110).

Figure 25:
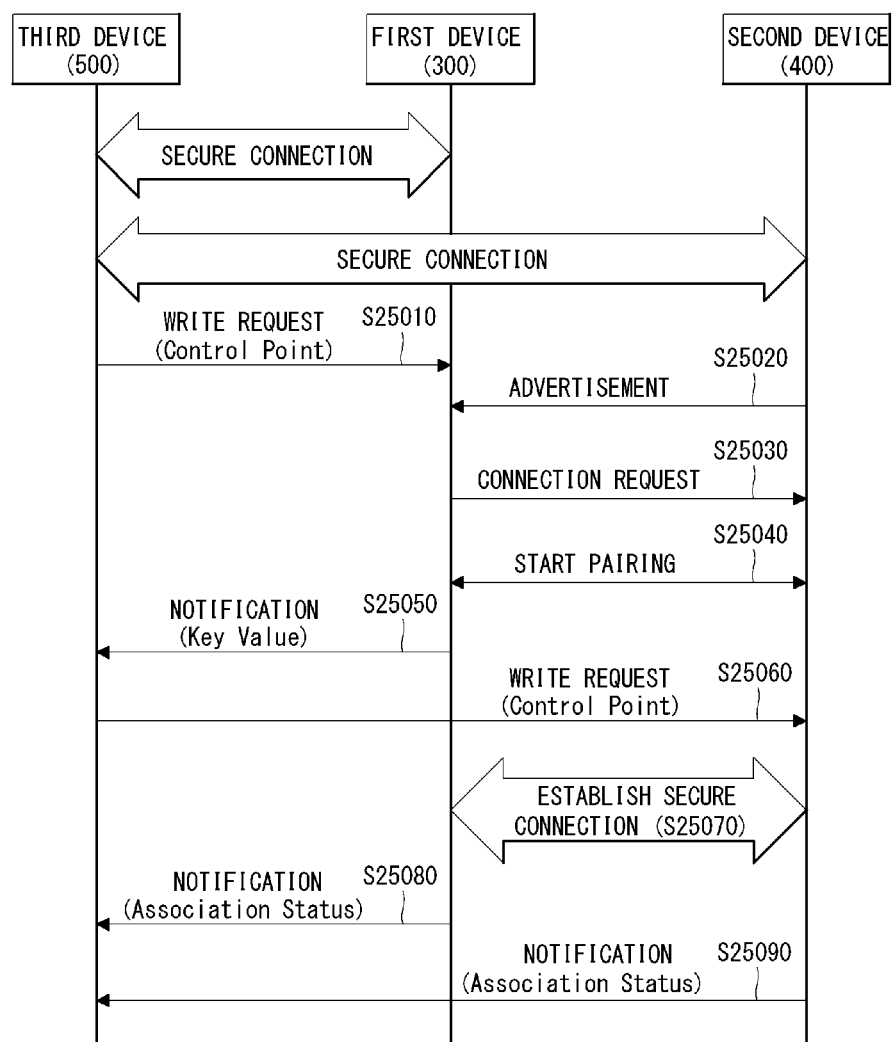
FIG. 25 is a flowchart illustrating another example of a method for forming a secure connection between devices through a control device proposed in the present disclosure.

FIG. 25 is a flowchart illustrating another example of a method for forming a secure connection between devices through a control device proposed in the present disclosure.

Referring to FIG. 25, the third device 500 controls the establishment of a secure connection between the first device 300 and the second device 400 through a passkey input method different from the method illustrated in FIG. 24.

First, it is assumed that a Bluetooth connection and a secure connection are established between the third device 500 and the first device 300 and between the third device 500 and the second device 400.

Specifically, the third device 500 having a secure connection with the first device 300 and the second device 400 transmits a write request message of requesting the writing of the control point characteristic to instruct the first device 300 to establish a connection with the second device 400 (S25010).

In this case, the write request message may include control information instructing the connection establishment as described above.

When the first device 300 receiving the write request message succeeds in the writing of the control point characteristic, a write response message indicating the write success is transmitted. Otherwise, the procedure is terminated, and a write response message indicating the write failure is transmitted.

When the first device 300 succeeds in the writing of the control point characteristic according to the instruction of the third device, the first device 300 performs a procedure for establishing a connection with the second device 400.

Specifically, the first device 300 receives an advertisement message transmitted from the second device 400, searches for the second device 400 (S25020), and transmits a connection request message to the second device 400 (S25030).

Thereafter, the first device 300 and the second device 400 may start a pairing procedure (S25040), and may establish a secure connection through a pass key input method.

Specifically, in order to establish a secure connection by performing the pairing procedure, the first device 300 transmits a notification message including a pass key inputted in its key value characteristic to the third device 500 (S25050).

The third device that acquires the pass key inputted in the Key value characteristic of the first device 300 through the notification message transmits a write request message for requesting writing of the Control point characteristic which instructs the second device 400 to input the acquired pass key (S25060).

In this case, the write request message may include an Opcode indicating the pass key input operation, and the Opcode indicating the pass key input operation may be referred to as an Insert Passkey value as shown in FIG. 23B.

The second device 400 that performs an input operation of the pass key stored in the key value characteristic of the first device 300 establishes a secure connection with the first device (S25070).

Since the association status of the first device 300 and the second device 400 is changed, the first device 300 and the second device 400 transmit a notification message including the changed association status information to the third device 500 (S25080, S25090).

Figure 26:
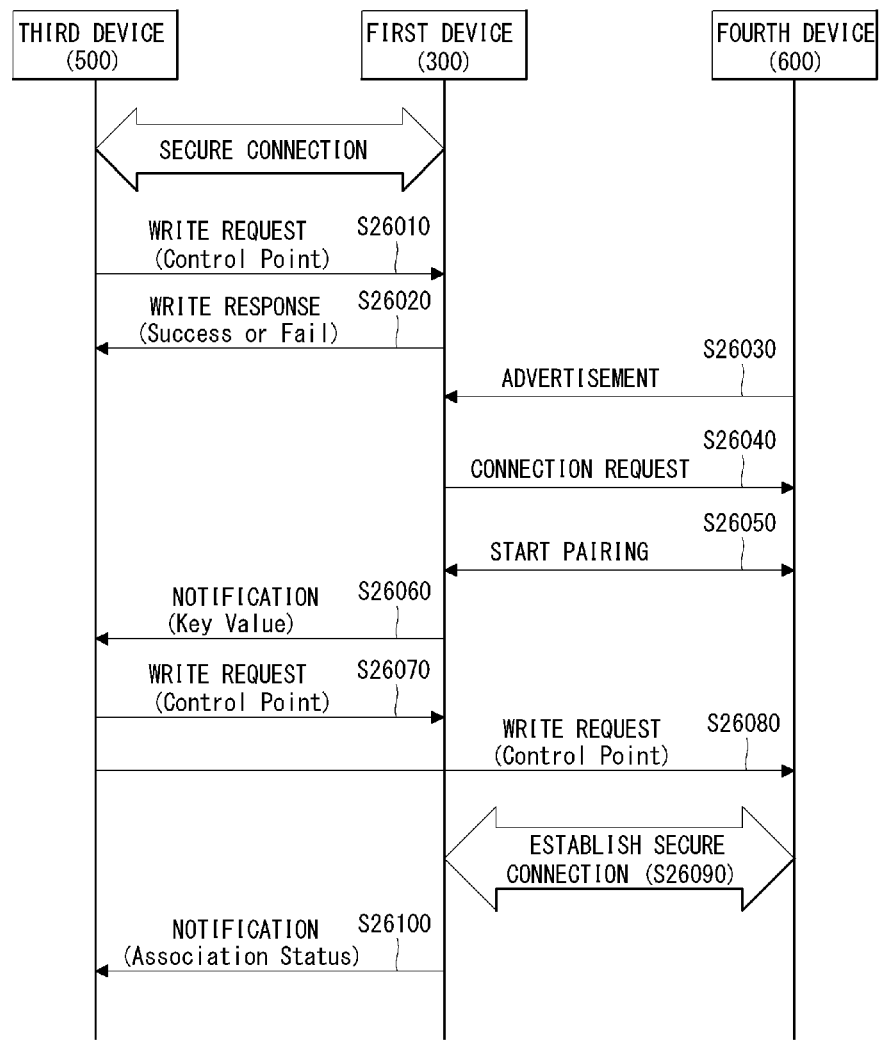
FIG. 26 is a flowchart illustrating an example of a method for forming a secure connection between a device and a legacy device through a control device proposed in the present disclosure.

FIG. 26 is a flowchart illustrating an example of a method for forming a secure connection between a device and a legacy device through a control device proposed in the present disclosure.

Referring to FIG. 26, the third device 500 may control the first device 300 and a fourth device 600 that is a legacy device to establish a secure connection through a numeric comparison method.

First, it is assumed that a Bluetooth connection and a secure connection are established between the third device 500 and the first device 300 and only a Bluetooth connection is established between the fourth device 600 and the second device 400.

The third device 500 having a secure connection with the first device 300 transmits a write request message for requesting writing of the control point characteristic to instruct the first device 300 to establish a connection with the fourth device 600 (S26010).

In this case, the write request message may include control information instructing the connection establishment as described above.

When the first device 300 receiving the write request message succeeds in the writing of the control point characteristic, a write response message indicating the write success is transmitted. Otherwise, the procedure is terminated, and a write response message indicating the write failure is transmitted (S26020).

When the first device 300 succeeds in the writing of the control point characteristic according to the instruction of the third device, the first device 300 performs a procedure for establishing a connection with the fourth device 600.

Specifically, the first device 300 receives an advertisement message transmitted from the fourth device 600, searches for the fourth device 600 (S26030), and transmits a connection request message to the fourth device 600 (S26040).

Thereafter, the first device 300 and the fourth device 600 may start a pairing procedure (S26050), and may establish a secure connection through a numeric comparison method.

Specifically, in order to establish a secure connection by performing the pairing procedure, the first device 300 transmits a notification message including a key value to the third device 500 (S26060).

However, since the fourth device 600 does not have a secure connection with the third device 500, the fourth device 600 does not transmit the key value for performing the numeric comparison method to the third device 500.

That is, since the key value of the fourth device 600 can be leaked to the outside, the fourth device 600 does not transmit the key value to the third device 500.

Accordingly, the third device 500 receives whether or not a key value of the first device 300 and a key value of the fourth device 600 are the same from a user to instruct a secure connection between the first device 500 and the fourth device 600.

That is, the third device 500 outputs the key value of the first device 300, and the fourth device 600 outputs the key value of the fourth device 600.

A user checks these, and inputs whether the key values are the same and whether a secure connection is established into the third device 500 and/or the fourth device 600.

If the key value is different, then a secure connection is not established between the first device 300 and the fourth device 600, and the procedure is terminated.

However, when the key values are the same, the third device 500 and the fourth device 600 receive the same key value and the secure connection establishment from a user.

The third device 500 that receives matching of the key values and the secure connection establishment from a user transmits a write request message for requesting writing of matching of the key values and writing of the control point characteristic to instruct the first device 300 and the second device 400 to establish the secure connection (S26070, S26080).

In this case, an Opcode written in the Control Point characteristic and the control information included in the write request message is a paring confirm described above.

The first device 300 that is instructed to establish a secure connection by the third device 500 establishes a secure connection with the fourth device 600, and transmits a notification message including the changed association status information to the third device 600 (S26090, S26100).

Through such a method, the third device 500 may control the first device 300 and/or the fourth device 600 that is a legacy device to establish a secure connection through a numeric comparison method.

Figure 27:
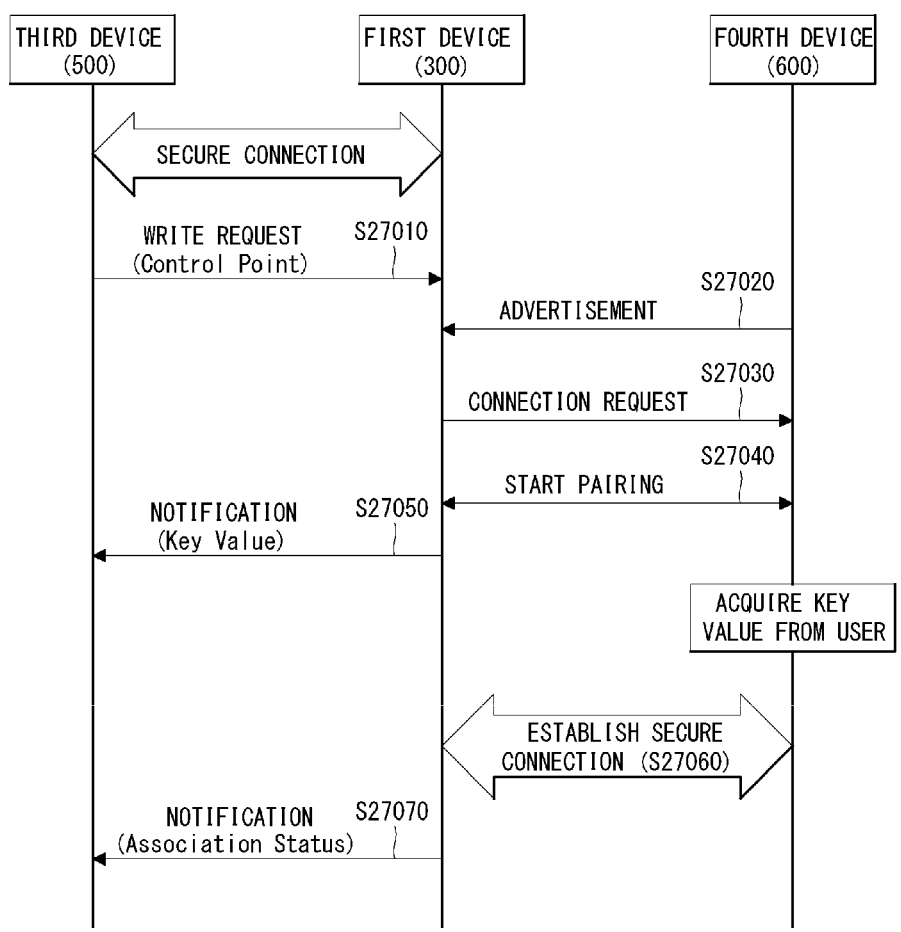
FIG. 27 is a flowchart illustrating another example of a method of forming a secure connection between a device and a legacy device through a control device proposed in the present disclosure.

FIG. 27 is a flowchart illustrating another example of a method of forming a secure connection between a device and a legacy device through a control device proposed in the present disclosure.

Referring to FIG. 27, the third device 500 may control the first device 300 and the fourth device 600 that is a legacy device to establish a secure connection through a pass key input method.

First, it is assumed that a Bluetooth connection and a secure connection are established between the third device 500 and the first device 300 and only a Bluetooth connection is established between the fourth device 600 and the second device 400.

Specifically, the third device 500 having a secure connection with the first device 300 transmits a write request message for requesting writing of the control point characteristic to instruct the first device 300 to establish a connection with the fourth device 600 (S27010).

In this case, the write request message may include control information instructing the connection establishment as described above.

When the first device 300 receiving the write request message succeeds in the writing of the control point characteristic, a write response message indicating the write success is transmitted. Otherwise, the procedure is terminated, and a write response message indicating the write failure is transmitted.

When the first device 300 succeeds in the writing of the control point characteristic according to the instruction of the third device, the first device 300 performs a procedure for establishing a connection with the fourth device 600.

Specifically, the first device 300 receives an advertisement message transmitted from the fourth device 600, searches for the fourth device 600 (S27020), and transmits a connection request message to the fourth device 600 (S27030).

Thereafter, the first device 300 and the second device 400 start the pairing procedure (S27040), and may establish a secure connection through the passkey input method.

Specifically, in order to establish a secure connection by performing the pairing procedure, the first device 300 transmits a notification message including a pass key inputted in its key value characteristic to the third device 500 (S27050).

Since a secure connection is not established between the fourth device 600 and the fourth device 600, the third device 500 cannot transmit the pass key transmitted from the first device 300 to the fourth device 600.

Accordingly, the fourth device 600 may receive the pass key of the first device 300 transmitted to the third device 500 from a user.

The fourth device 600 that receives the pass key stored in the key value characteristic of the first device 300 establishes a secure connection with the first device 300 (S27060).

Since the association status of the first device 300 is changed, the first device 300 transmits a notification message including the changed association status information to the third device 500 (S27070).

Figure 28:
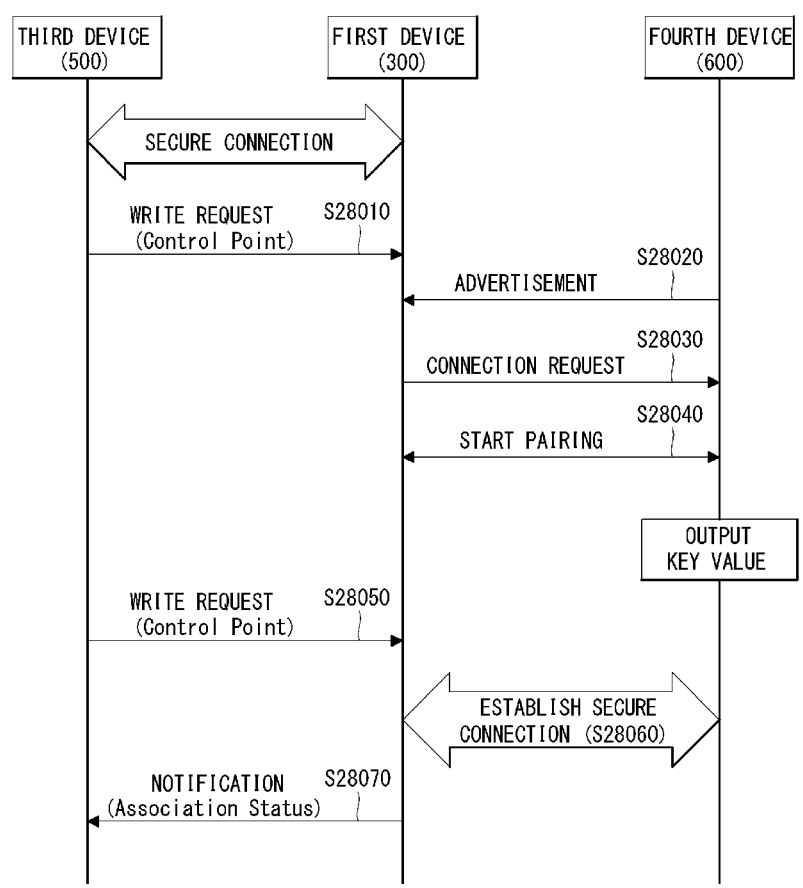
FIG. 28 is a flowchart illustrating another example of a method of forming a secure connection between a device and a legacy device through a control device proposed in the present disclosure.

FIG. 28 is a flowchart illustrating another example of a method of forming a secure connection between a device and a legacy device through a control device proposed in the present disclosure.

Referring to FIG. 28, the third device 500 controls the first device 300 and the fourth device 600 that is a legacy device to establish a secure connection through a pass key input method.

First, it is assumed that a Bluetooth connection and a secure connection are established between the third device 500 and the first device 300 and only a Bluetooth connection is established between the fourth device 600 and the second device 400.

Since the steps S28010 to S28040 of FIG. 28 are the same as the steps S27010 to S27040 of FIG. 27, a description thereof will be omitted.

Specifically, the fourth device 600 that initiates a pairing procedure with the first device 300 outputs a pass key stored in the key value characteristic of the fourth device 600 through an output unit in order to establish a secure connection through a pass key method.

The third device 500 may receive the outputted pass key of the fourth device 600 from a user.

The third device transmits a write request message for requesting writing of a control point characteristic instructing an input operation of the pass key to input the received pass key into the first device 300 (S28050).

In this case, the Opcode indicating the pass key input operation in the write request message and the control point characteristic is the Insert Passkey as described above.

The first device 300 that performs the input operation of the pass key stored in the key value characteristic of the fourth device 600 establishes a secure connection with the fourth device 600 (S28060).

Since the association status of the first device 300 is changed, the first device 300 transmits a notification message including the changed association status information to the third device 500 (S28070).

Through such a method, even in the case of a legacy device having a limited unit or no established secure connection, it is possible to control the establishment of the secure connection through the third device 500.

Figure 29:
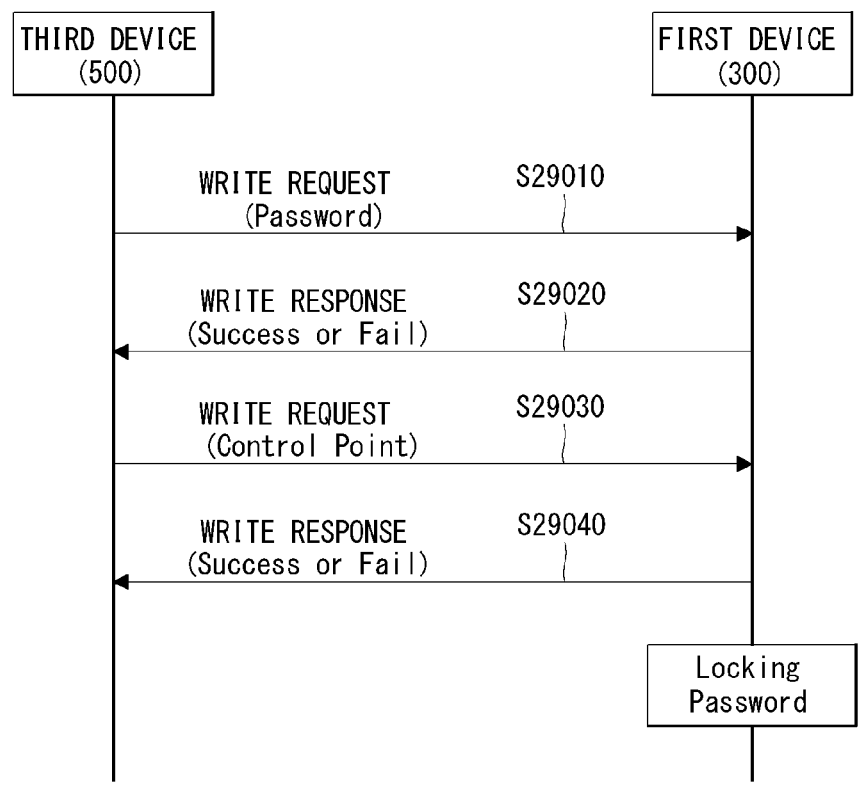

FIGS. 29 and 30 are views illustrating an example of a method and characteristic for setting a password of a device through a control device proposed in the present disclosure.

Referring to FIGS. 29 and 30, the third device 500 may set a password to limit the operation control of the first device 300 to a specific device.

First, it is assumed that the Bluetooth connection and authentication procedures between the third device 500 and the first device 300 are completed.

Specifically, the third device 500 transmits a request write request message for requesting writing of a password characteristic shown in FIG. 30A to the first device 300 in order to set a password for the operation control of the first device 300 (S29010).

In this case, the write request message may include a password (first password) to be set.

The password characteristic means a characteristic storing a password value for the operation control of the first device 300.

The first device 300 transmits a write response message to the third device 500 in response to the write request (S29020).

In this case, when the password is successfully written in the password characteristic, the first device 300 transmits a write response message indicating a write success, and when failed, transmits a write response message indicating a write failure.

After the password is set in the first device 300, the third device transmits a write request message for requesting writing of a Control point characteristic instructing a lock function of the set password to prevent anther device from changing the set password (S29030).

In this case, the Opcode instructing the lock function of the pass key in the write request message and the control point characteristic may be referred to as a lock password as shown in FIG. 30B.

The Unlock Password that is an Opcode shown in FIG. 30B means an operation code for cancelling a lock function of the password. The Authorize a Connection Device means an operation code for controlling, by an authorized device, the operation of the first device 300 without a separate password.

The first device 300 transmits a write response message to the third device 500 in response to the write request (S29040).

In this case, when the Opcode is successfully written in the Control point characteristic, the first device 300 transmits a write response message indicating a write success, and when failed, transmits a write response message indicating a write failure.

When the writing fails, the set password may be changed by another device without setting the lock function.

However, when the writing is successful, the lock function is set and the set password may not be changed by another device until the lock function is canceled.

Through such a method, the operation control of the first device 300 may be limited to a device into which a password is inputted, and it is possible to prevent another device from arbitrarily controlling the operation of the first device 300.

Figure 31:
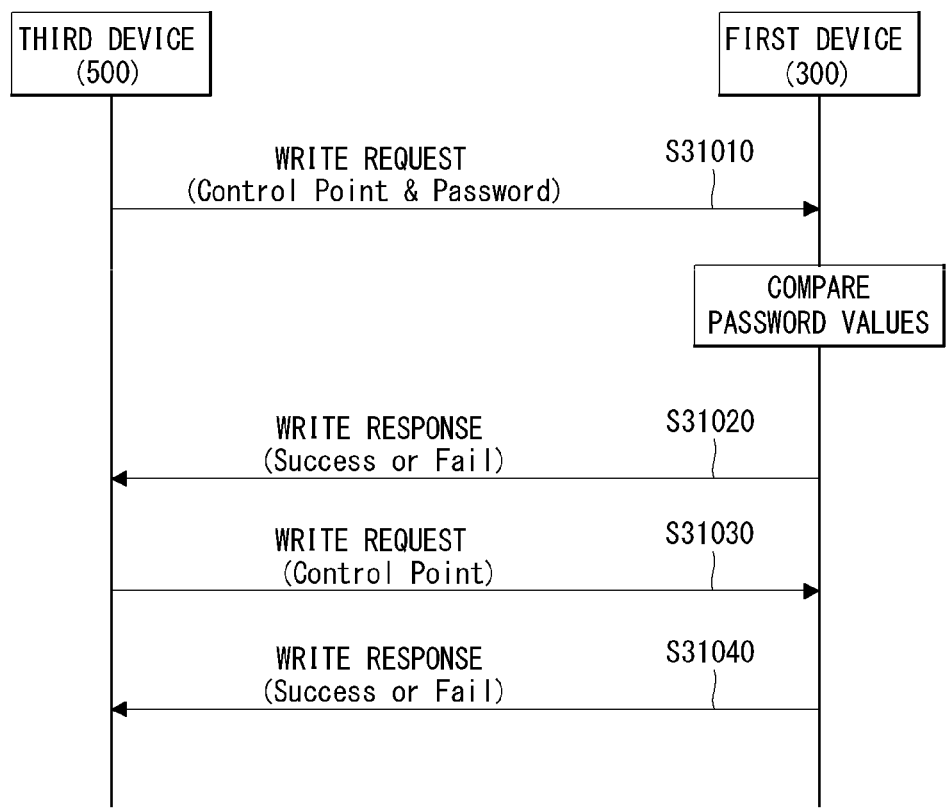
FIG. 31 is a flowchart illustrating an example of a method for controlling a device through a set password proposed in the present disclosure.

FIG. 31 is a flowchart illustrating an example of a method for controlling a device through a set password proposed in the present disclosure.

Referring to FIG. 31, when a password is set through the method of FIGS. 29 and 30, the operation of the first device 300 can be controlled only by inputting the set password.

First, it is assumed that the Bluetooth connection and authentication procedures are completed between the third device 500 and the first device 300, and the password of the first device 300 is set through the method of FIG. 30.

Specifically, the third device 500 may transmit a write request message requesting writing of the Control Point characteristic to instruct the first device 300 to which the password is set to perform a specific operation (S31010).

In this case, the write request message may include a password (second password) for controlling the operation of the first device 300 and the control information described above.

The first device 300 that receives the write request message may compare the second password with the first password to determine whether to perform the specific operation.

That is, when the first password and the second password do not match, a write response message indicating a password mismatch is transmitted without writing the Opcode indicating the specific operation in the Control Point characteristic.

However, when the first password and the second password match each other, the operation code indicating the specific operation is written in the Control point to perform the specific operation, and a write response message indicating the writing of the Opcode indicating the specific operation in the Control point characteristic is transmitted (S31020).

In this case, when the Opcode indicating the specific operation is an Authorize a Connection device shown in FIG. 30B, the third device 500 can control the first device 300 without transmitting a password later.

For example, when the Opcode is the Authorize a Connection Device, after the step S31020, the third device 500 may transmit a write request message for requesting the writing of the Control Point characteristic to instruct the first device 300 to perform a specific operation (S31030).

In this case, since the third device 500 is in an authorized state through steps S31010 and S31020, the write request message does not include a password.

Even when the password is set, the first device 300 identifies the third device 500, and then writes Opcode indicating the specific operation in the Control Point characteristic without a separate password comparison procedure.

Thereafter, the first device 300 transmits a write response message indicating the success of the writing to the third device 500, and performs the specific operation (S31040).

Through such a method, even when a password is set to the first device 300, a specific device can control the first device 300 without inputting a password.

Figure 32:
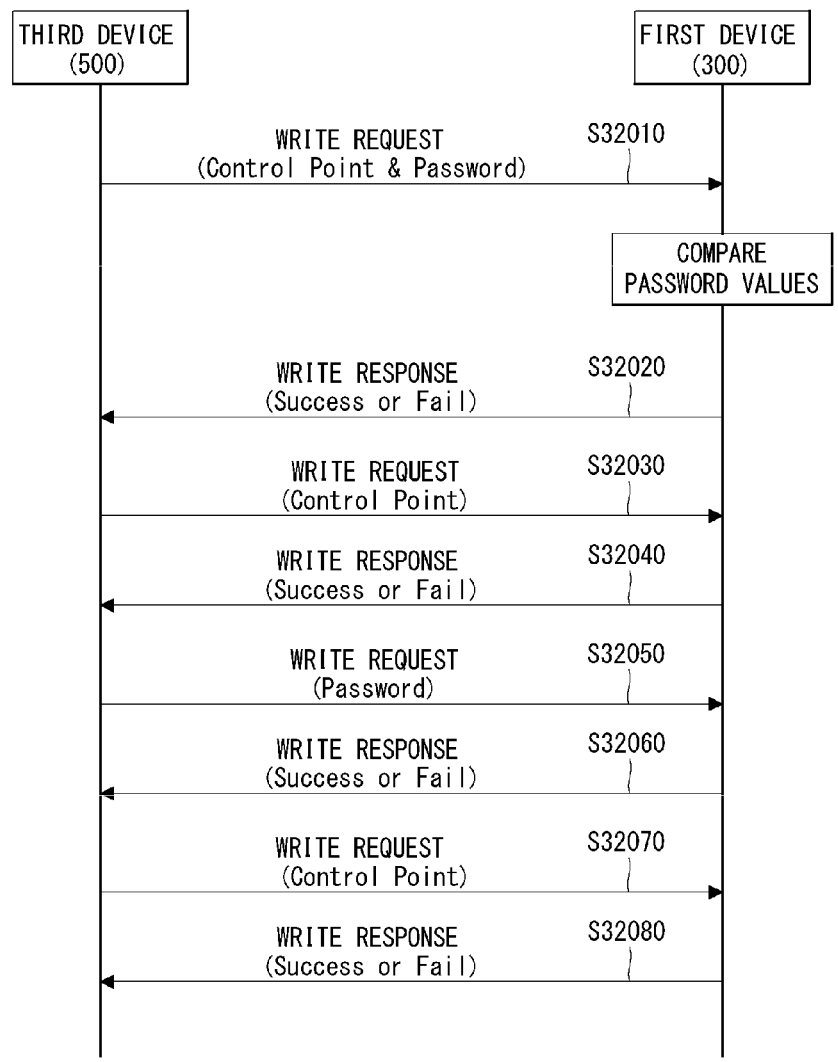
FIG. 32 is a flowchart illustrating an example of a method for cancelling and resetting a password for device control proposed in the present disclosure.

FIG. 32 is a flowchart illustrating an example of a method for cancelling and resetting a password for device control proposed in the present disclosure.

Referring to FIG. 32, when a password and a lock function for controlling the operation are set in the first device 300, the password function may be canceled and the set password may be changed.

First, it is assumed that the Bluetooth connection and authentication procedures are completed between the third device 500 and the first device 300, and the password of the first device 300 is set through the method of FIG. 30.

The third device 500 transmits a write request message for requesting the writing of the Authorize a Connection Device, which is the Opcode described above, in the Control Point characteristic of the first device 300 (S32010).

In this case, the write request message may include a password (second password) for instructing a specific operation.

The first device 300 compares the first password, which is a preset password, with the second password, and when the first password and the second password do not match, transmits a write response message indicating a password mismatch and a write failure.

However, when the first password and the second password match, the first device 300 writes the Opcode included in the write request message in the Control Point characteristic, and transmits a write response message indicating the write success (S32020).

When the writing is successful, the third device 500 transmits a write request message for requesting writing of the Unlock Password, which is the Opcode described above, in the Control Point characteristic of the first device 300 to cancel the lock function set in the first device 300 (S32030).

In this case, since the third device 500 can control the first device 300 without a separate password through steps S32010 and S32020, the write request message may not include a separate password.

In response to the write request message, the first device 300 cancels the lock function and transmits a write response message indicating the write success (S32040).

After the lock function is canceled, the third device 500 transmits a write request message for requesting writing of a new password (third password) in the password characteristic described above in order to change the password of the first device 300 (S32050).

The first device 300 changes the value of the password characteristic from the first password to the third password according to the write request message, and then transmits a write response message indicating the write success (S32060).

After the third password is set in the first device 300, the third device transmits a write request message for requesting writing of a Control point characteristic indicating a lock function of the set password to prevent another device from changing the set password (S32070).

The first device 300 writes an Opcode indicating the lock function in the Control Point characteristic, and transmits a write response message indicating the write success (S32080).

Thereafter, since the lock function is set for the changed password, another device cannot change the set password until the lock function is cancelled.

Through such a method, the third device 500 may change the password for controlling the operation of the first device 300.

FIG. 33 is a view illustrating an example of an operation code for management of a whitelist of a device proposed in the present disclosure.

The first device may perform an auto connection with a specific device through a whitelist. That is, a device, information of which is included in the whitelist of the first device, may perform an automatic connection with the first device.

In this case, the third device may add or delete device information of a specific device to the whitelist of the first device.

Specifically, the third device transmits, to the first device, a write request message to request writing of the Control Point characteristic to manage the whitelist of the first device.

In this case, the write request message may include control information, and the control information and the control point characteristic may be configured as shown in FIG. 33A.

The Opcode and the Operand included in the control information and the Control Point may have values as shown in FIG. 33B.

The first device that receives the write request message operates according to the Opcode included in the control information.

For example, the first device may add or delete device information to/from the whitelist according to the Opcode, or may delete all device information.

Through such a method, the third device may manage the whitelist of the first device.

If the whitelist for automatic connection is added/deleted through bonding information, the Control Point characteristic for adding or deleting the device information in the whitelist may not be used.

Figure 34:
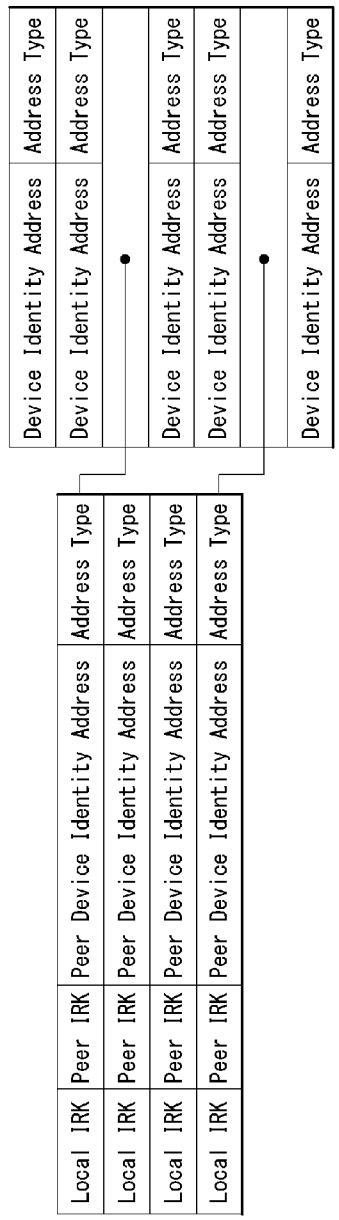
FIG. 34 is a view illustrating an example of a resolving list and a whitelist for automatic connection proposed in the present disclosure.

FIG. 34 is a view illustrating an example of a resolving list and a whitelist for automatic connection proposed in the present disclosure.

When the whitelist for automatic connection can be added or deleted through bonding information, the resolving list including the bonding information and the whitelist may be configured as shown in FIG. 34.

The first device may perform the automatic connection through the bonding information by adding or deleting the resolving list including the bonding information to the whitelist.

The bonding information may include other information according to the connection type. That is, the bonding information may include other information according to whether the connection type is Bluetooth BR/EDR or Bluetooth LE.

When the connection type is Bluetooth BR/EDR, the bonding information may include the following information.

A common link Key: A key that is exchanged through a bonding procedure for later authentication.

When the connection type is Bluetooth LE, the bonding information may include the following information.

Identity Resolving Key (IRK)
    Connection Signature Resolving Key (CSRK)
    Long Term Key (LTK)
    Encrypted Diversifier (EDIV)
    Random Number (Rand)

Through the whitelist based on the bonding information, the first device may perform an automatic connection with another device.

Although the present invention proposed in the present disclosure has been described on the basis of Bluetooth LE, it is also applicable to Bluetooth BR/EDR.

Furthermore, although the drawings have been dividedly described for the sake of convenience of explanation, it is also possible to design a new embodiment so as to be implemented by merging the embodiments described in each drawing. Also, according to the needs of those skilled in the art, it is also within the scope of the present invention to design a computer-readable recording medium in which programs for executing the previously described embodiments are recorded.

The direction-based device search method according to the present disclosure cannot be applied such that configurations and methods of the embodiments described above are limited, but all or some of the embodiments may be selectively combined such that the embodiments can be variously modified.

Meanwhile, the direction-based device search method of the present disclosure may be implemented as a code that can be read by a processor on a recording medium readable by a processor included in the network device. The processor-readable recording media include all kinds of recording apparatuses in which data readable by a processor are stored. Examples of the recording media readable by a processor include a ROM, a RAM, a CD-ROM, a magnetic tape, a floppy disk, an optical data storage device, and the like, and may also be implemented in a form of a carrier wave such as transmission via the Internet. In addition, the processor-readable recording media may be distributed over network-connected computer systems such that a code readable by a processor by a distributed method can be stored and executed.

While exemplary embodiments of the present disclosure have been illustrated as above, the present disclosure is not limited to a specific embodiment described above. Also, it will be apparent to those skilled in the art that various modifications in form and details can be made without departing from the spirit and scope of the present invention and these modifications should not be separately understood from the technical spirit or prospect of the present invention.

In the present disclosure, both apparatus and method inventions are being explained, and the descriptions of the two inventions can be supplemented as necessary.

According to a method for controlling a device using Bluetooth technology according to an embodiment of the present invention, the operation of another device can be controlled through a control device.

Also, according to an embodiment of the present invention, it is possible to control the operation related to the association of devices, by acquiring status information indicating an association status of a device associated with one or more devices, using Bluetooth technology.

Also, according to an embodiment of the present invention, a control device can acquire information related to the controllable operation of a device using Bluetooth technology and can control the device, thereby effectively controlling the device.

In addition, according to an embodiment of the present invention, connection of a device without a User Interface (UI) can be efficiently performed by controlling another device through a control device using Bluetooth technology.

Furthermore, according to an embodiment of the present invention, a password for controlling a connection between devices using Bluetooth technology can be set and cancelled.

The effects obtainable in the present disclosure are not limited to the above-mentioned effects, and other effects that are not mentioned can be clearly understood by those skilled in the art from the following descriptions.

What is claimed is:

1. A method of controlling a connection between a first device and a second device by a control device using Bluetooth, the method comprising:
   receiving an advertising message, from the first device, including service information indicating whether a device control service is supported;
   establishing a Bluetooth low energy (LE) connection with the first device when the first device supports the device control service;
   transmitting a read request message to the first device to request feature information related to a controllable operation mode and procedure supported by the first device;
   receiving a read response message, from the first device, including the feature information in response to the read request message;
   transmitting a first write request message, to the first device, for requesting writing of a control characteristic for controlling a specific operation related to pairing and connection between the first device and the second device based on the feature information,
   controlling a configuration of a secure connection between the first device and the second device by using a specific key value,
   wherein the specific key value is used to control the configuration of the secure connection between the first device and the second device;
   receiving a first write response message, from the first device, in response to the first write request message,
   wherein the write request message includes control information related to the specific operation; and
   receiving a first notification message, from the first device, including first association status information.

2. The method of claim 1, wherein the feature information includes at least one of a connection type supported by the first device, a role according to the connection type or an operation mode and procedure.

3. The method of claim 2, wherein the connection type is one of a Bluetooth basic rate/enhanced data rate (BR/EDR) or a Bluetooth LE.

4. The method of claim 1, wherein the control information includes at least one of an operation code indicating the specific operation, a peer device ID indicating an address of a peer device to perform the specific operation, a connection type according to the operation code, or operation information indicating operation mode and procedure according to the specific operation.

5. The method of claim 4, wherein the address of the peer device is one of a public address type or a random address type.

6. The method of claim 1, further comprising:
   transmitting a second write request message, to the first device, for requesting setting of a first password for control of the first device; and
   receiving a second write response message in response to the second write request message.

7. The method of claim 6, wherein the control information further includes a second password for control of the specific operation.

8. The method of claim 6, comprising:
   transmitting a third write request message, to the first device, for changing the first password; and
   receiving a third write response message, to the first device, in response to the third write request message,
   wherein the third write request message includes a second password that is a password to be changed.

9. The method of claim 1, wherein the first write response message includes information indicating whether the first device writes the specific operation in its control characteristic.

10. The method of claim 1, wherein the secure connection is established through a numeric comparison method, and
   wherein the controlling the secure connection comprises:
   transmitting a fourth write request message, to the first device, for requesting writing of the control point characteristic to instruct the first device to establish a connection with the second device;
   receiving a fourth write response message in response to the fourth write request message;
   receiving a second notification message, from the first device, including a first key value of the first device;
   receiving a third notification message, from the second device, including a second key value of the second device;
   comparing the first key value with the second key value;
   transmitting a fifth write request message to the first device;
   transmitting a sixth write request message to the second device;
   receiving a fourth notification message, from the first device, including second association status information; and
   receiving a fifth notification message, from the second device, including third association status information.

11. The method of claim 10, wherein each of the fifth write request message and the sixth request message requests writing of the control point characteristic to instruct to establish the secure connection between the first device and the second device, and indicates that the first key value and the second key value are matched when the first key value and the second key value are matched.

12. The method of claim 1, wherein the secure connection is established through a pass key input method, and
   wherein the controlling the configuration of the secure connection comprises:
   transmitting a fourth write request message, to the first device, for requesting writing of a first pass key value in its key value characteristic,
   wherein the fourth write request message includes the first pass key value;
   receiving a fourth write response message from the first device in response to the fourth write request message;
   transmitting a fifth write request message, to the second device, for requesting writing of a second pass key value in its key value characteristic,
   wherein the fifth write request message includes the second pass key value which is the same value as the first pass key value;
   receiving a fifth write response message from the second device in response to the fifth write request message;

transmitting a sixth write request message, to the first device, for requesting writing of a control characteristic to instruct the first device to establish a connection with the second device;

receiving a sixth write response message from the first device in response to the sixth write request message;

receiving a second notification message, from the first device, including second association status information; and receiving a third notification message, from the second device, including third association status information.

13. The method of claim 12, wherein the fourth write response message includes information indicating whether the first device writes the first pass key value successfully in its key value characteristic, and wherein the fifth write response message includes information indicating whether the second device writes the second pass key value successfully in its key value characteristic.

14. A control device for controlling a connection between a first device and a second device using Bluetooth, the control device comprising:

a transceiver configured to transmit and receive signals; and a processor functionally connected to the transceiver, the processor:

receiving an advertising message, from the first device, including service information indicating whether a device control service is supported;

establishing a Bluetooth low energy (LE) connection with the first device when the first device supports the device control service;

transmitting a read request message to the first device to request feature information related to a controllable operation mode and procedure supported by the first device;

receiving a read response message, from the first device, including the feature information in response to the read request message;

transmitting a write request message, to the first device, for requesting writing of a control characteristic for controlling a specific operation related to pairing and connection between the first device and the second device based on the supported feature information;

controlling a configuration of a secure connection between the first device and the second device by using a specific key value, wherein the specific key value is used to control the configuration of the secure connection between the first device and the second device;

receiving a first write response message in response to the write request message, wherein the write request message includes control information related to the specific operation; and receiving a notification message from the first device including association status information.

* * * * *